U S011503293B2

United States Patent
Zhang et al.

(10) Patent No.: US 11,503,293 B2
(45) Date of Patent: Nov. 15, 2022

(54) RESIDUAL CODING FOR TRANSFORM SKIPPED BLOCKS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Jizheng Xu, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/675,756

(22) Filed: Feb. 18, 2022

(65) Prior Publication Data

US 2022/0210414 A1  Jun. 30, 2022

Related U.S. Application Data

(63) Continuation of application No. PCT/CN2020/110150, filed on Aug. 20, 2020.

(30) Foreign Application Priority Data

Aug. 20, 2019  (WO) ................ PCT/CN2019/101608

(51) Int. Cl.
*H04N 19/12* (2014.01)
*H04N 19/176* (2014.01)
(Continued)

(52) U.S. Cl.
CPC ........... *H04N 19/12* (2014.11); *H04N 19/176* (2014.11); *H04N 19/18* (2014.11); *H04N 19/48* (2014.11); *H04N 19/60* (2014.11)

(58) Field of Classification Search
CPC ...... H04N 19/12; H04N 19/176; H04N 19/18; H04N 19/48; H04N 19/60
See application file for complete search history.

(56) References Cited

U.S. PATENT DOCUMENTS 10,404,988 B2   9/2019  Ye et al.
11,172,216 B1  11/2021  Zhang et al.
(Continued)

FOREIGN PATENT DOCUMENTS

WO    2013003584 A1   1/2013

OTHER PUBLICATIONS

Bross et al. "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0464, 2019.

(Continued)

*Primary Examiner* — Jae N Noh
(74) *Attorney, Agent, or Firm* — Perkins Coie LLP

(57) ABSTRACT

A video processing method includes determining, for a conversion between a current block of a video and a bitstream representation of the video, whether to enable a level mapping operation or a level remapping operation based on a rule, wherein the level mapping operation or the level remapping operation includes changing between a first representation of a residual coefficient of the current block and a second representation of the residual coefficient of the current block based on neighboring residual coefficients of the residual coefficient; and performing the conversion by selectively using the level mapping operation or the level remapping operation based on the determining.

20 Claims, 25 Drawing Sheets

(51) Int. Cl.
*H04N 19/60* (2014.01)
*H04N 19/18* (2014.01)
*H04N 19/48* (2014.01)

(56) References Cited

U.S. PATENT DOCUMENTS

| | | | |
|---|---|---|---|
| 11,252,420 B2* | 2/2022 | Salehifar | H04N 19/12 |
| 2018/0014017 A1 | 1/2018 | Li et al. | |
| 2018/0352226 A1 | 12/2018 | An et al. | |
| 2020/0404274 A1* | 12/2020 | Karczewicz | H04N 19/124 |
| 2021/0385439 A1 | 12/2021 | Zhu et al. | |
| 2022/0007057 A1 | 1/2022 | Liu et al. | |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Choi et al. "Reports on Level Mapping Off Versus Level Mapping On," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0298, 2020.
Karczewicz et al. "CE8-Related: Sign Context Modelling and Level Mapping for TS Residual Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0455, 2019.
Karczewicz et al. "CE7-Related: Alternative Method to RDPCM with TS Level Mapping," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0556, 2019.
Karczewicz et al. "CE7: Sign Context, Level Mapping, and Bitplane Coding for TS Residual Coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0122, 2019.
Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.
Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0193, 2019.
Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.
Zhu et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.
https://vcgit.hhi.fraunhofer.de/jvet/VVCSoftware_VTM/tags/VTM-5.0.
International Search Report and Written Opinion from International Patent Application No. PCT/CN2020/110150 dated Nov. 26, 2020 (10 pages).
Zhang et al. "#545 (Wrong Level Mapping of Zero Coefficents in TS Residual Coding)," JVET VVC, Nov. 7, 2019, XP055955651.
Extended European Search Report from European Patent Application No. 20854012.0 dated Sep. 22, 2022 (12 pages).

* cited by examiner

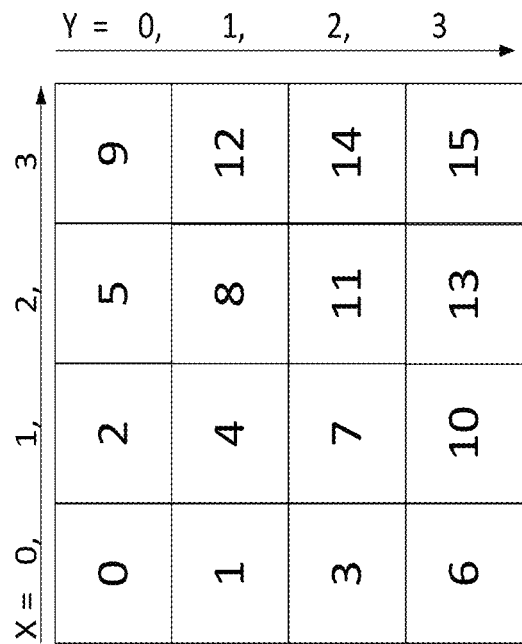
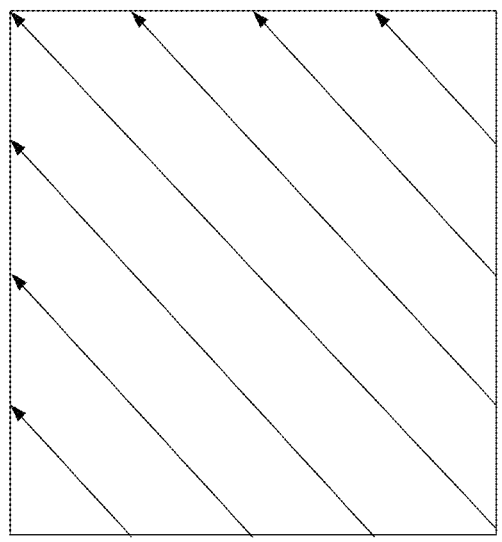
FIG. 7

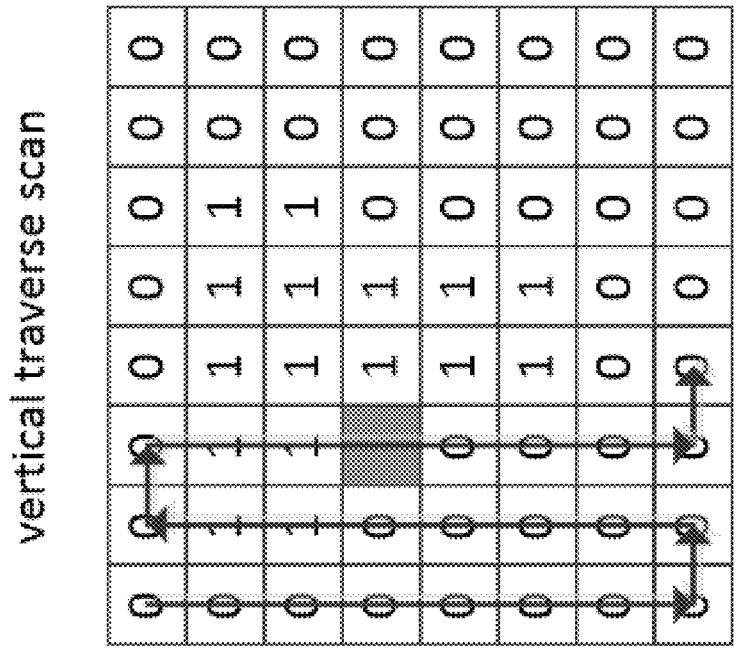
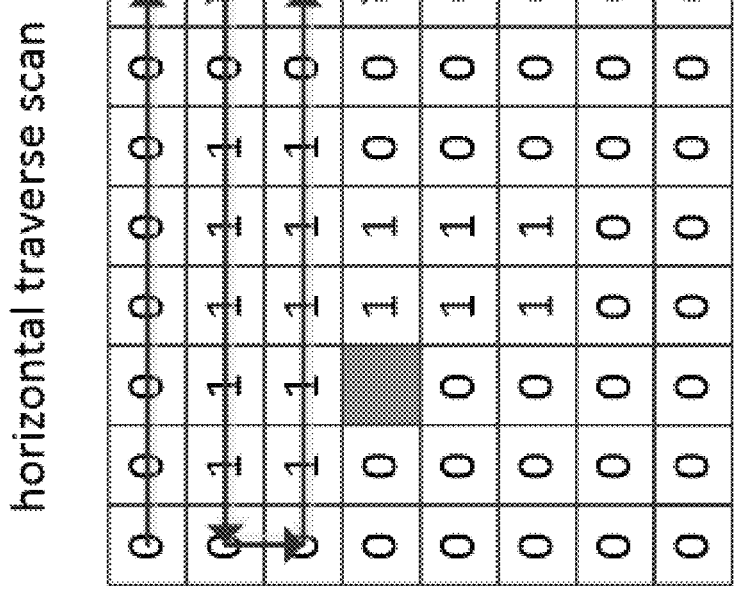
FIG. 15

FIG. 25

2502: Performing a conversion between a current block of a video and a bitstream representation of the video, wherein the bitstream representation conforms to a format rule that specifies that a syntax element is included in the bitstream for indicating that absolute values of a subset of coefficients of a video unit of the current block are greater than M, wherein M is an integer

2500

RESIDUAL CODING FOR TRANSFORM SKIPPED BLOCKS

CROSS REFERENCE TO RELATED APPLICATIONS

This application is a continuation of International Patent Application No. PCT/CN2020/110150, filed on Aug. 20, 2020, which claims the priority to and benefits of International Patent Application No. PCT/CN2019/101608, filed on Aug. 20, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video coding and decoding that uses a transform-skip block coding tool are disclosed.

In one example aspect, a method of video processing is disclosed. The method includes determining, for a conversion between a current block of a video and a bitstream representation of the video, whether to enable a level mapping operation or a level remapping operation based on a rule, wherein the level mapping operation or the level remapping operation includes changing between a first representation of a residual coefficient of the current block and a second representation of the residual coefficient of the current block based on neighboring residual coefficients of the residual coefficient; and performing the conversion by selectively using the level mapping operation or the level remapping operation based on the determining.

In another example aspect, a method of video processing is disclosed. The method includes determining, based on a rule, one or more previously decoded coefficients used as predictors during a level mapping operation or a level remapping operation, wherein the level mapping operation or the level remapping operation includes changing between a first representation of a residual coefficient and a second representation of the residual coefficient of the current block based on neighboring residual coefficients of the residual coefficient, wherein the one or more previously decoded coefficients are used according to a decoding order or a scanning order; and performing a conversion between a current block of a video and a bitstream representation of the video using the one or more previously decoded coefficients.

In another example aspect, a method of video processing is disclosed. The method includes performing a conversion between a current block of a video and a bitstream representation of the video, wherein the bitstream representation conforms to a format rule that specifies that a syntax element is included in the bitstream for indicating that absolute values of a subset of coefficients of a video unit of the current block are greater than M, wherein M is an integer.

In another example aspect, a method of video processing is disclosed. The method includes determining whether a condition related to enablement of a level recalculation for a conversion between a current block of a video and a bitstream representation is satisfied, performing the conversion wherein the level recalculation is selectively used based on the determining, wherein, the level recalculation includes changing between a first representation of a residual coefficient and a second representation of the residual coefficient of the current block used during the conversion.

In another example aspect, another method of video processing is disclosed. The method includes determining to perform a level recalculation for a conversion between a current block of a video and a bitstream representation is satisfied, wherein, the level recalculation includes changing between a first representation of a residual coefficient and a second representation of the residual coefficient of the current block used during the conversion; determining, based on a rule, one or more decoded coefficients used as predictors during the level recalculation; and performing the conversion using the one or more decoded coefficients.

In another example aspect, another method of video processing is disclosed. The method includes determining, for a conversion between a current block of a video and a coded representation, whether a subset of absolute coefficients of a video unit corresponding to the current block are all greater than M, where M is an integer, and performing the conversion based on the determining.

In another example aspect, another method of video processing is disclosed. The method includes determining whether a rule related to enablement of a level recalculation for a conversion between a current block of a video and a bitstream representation is satisfied, wherein the conversion uses a block differential pulse-code modulation (BDPCM) coding tool; performing the conversion wherein the level recalculation is selectively used based on the determining, wherein, the level recalculation includes changing between a first representation of a residual coefficient and a second representation of the residual coefficient of the current block used during the conversion.

In another example aspect, another method of video processing is disclosed. The method includes determining whether a rule related to enablement of a level recalculation for a conversion between a current block of a video and a bitstream representation is satisfied, wherein the conversion is based on a palette coding mode; performing the conversion wherein the level recalculation is selectively used based on the determining, wherein, the level recalculation includes changing between a first representation of a palette index or an escape symbol and a second representation of the palette index or the escape symbol during the conversion.

In yet another example aspect, another method of video processing is disclosed. The method includes determining that a conversion between a current block and a bitstream representation of the current block is based on a transform skip mode in which a transform operation on coefficients of the current block is skipped, determining a context model for the conversion based on the coefficients and a rule, and performing the conversion using the transform skip mode and based on the context model.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 7 shows a diagonal up-right scan order (4×4 as a CG for example).

FIG. 15 shows examples of horizontal and vertical traverse scans.

FIGS. 23-25 show flowcharts for example methods of video processing.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. SUMMARY

This document is related to image/video coding technologies. Specifically, it is related to residual coding in image/video coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and M PEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Committee Draft) could be found at:

http://phenix.it-sudparis.eu/jvet/doc_end_user/documents/15_Gothenburg/wg11/JVET-O2001-v14.zip The latest reference software of VVC, named VTM, could be found at: https://vcgit.hhi.fraunhofer.de/jvet/VVCSoftware_VTM/tags/VTM-5.0

2.1. Coding Flow of a Typical Video Codec

Figure 1:
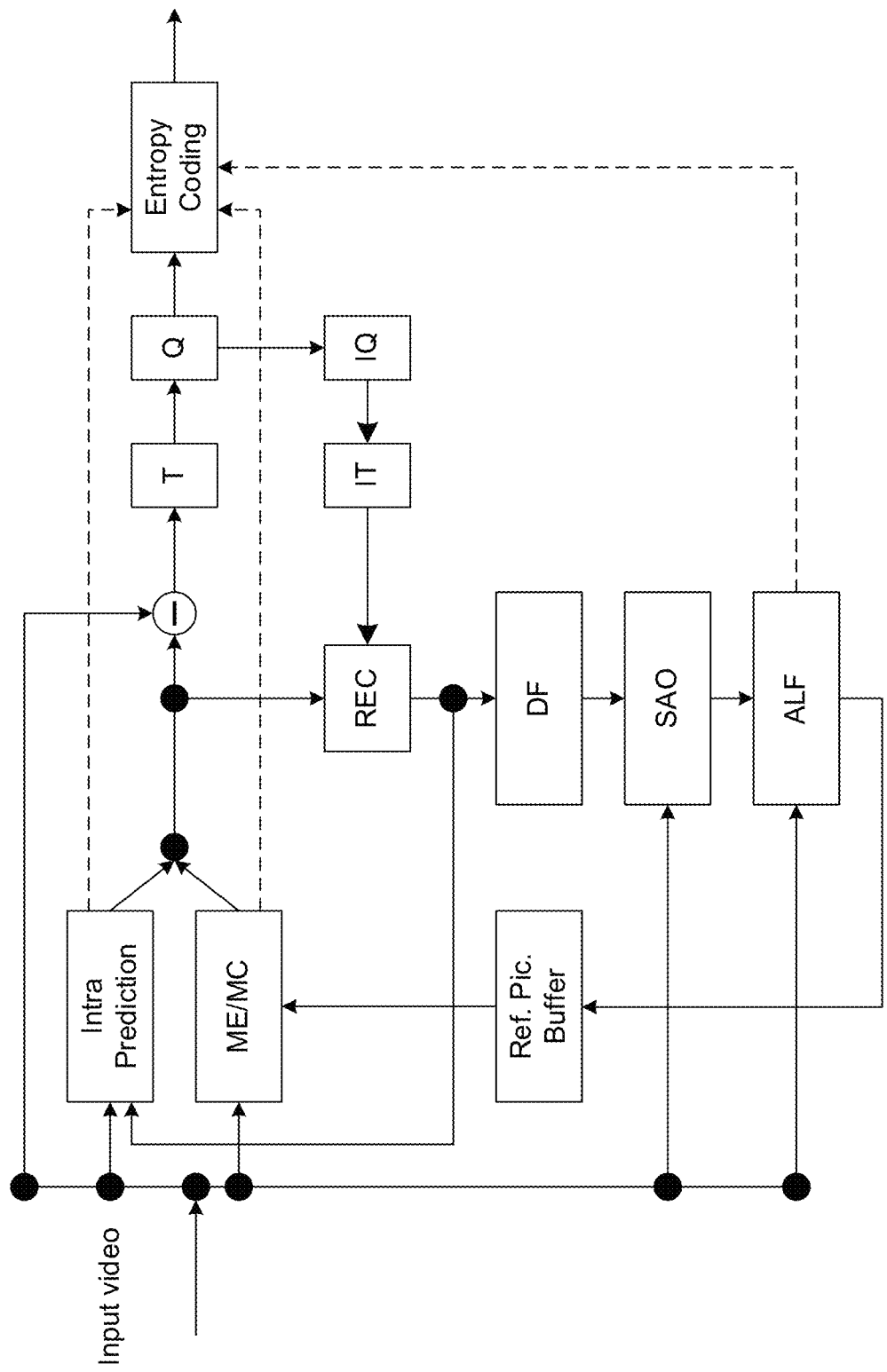
FIG. 1 is a block diagram of an example video encoder implementation.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2. Transform Coding in VVC 2.2.1. Multiple Transform Set (MTS) in VVC 2.2.1.1. Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 1 below shows the basis functions of the selected DST/DCT.

TABLE 1

Basis functions of transform matrices used in VVC.

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 2. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 2

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.2.2. Reduced Secondary Transform (RST) Proposed in JVET-N0193

2.2.2.1. Non-Separable Secondary Transform (NSST) in JEM

Figure 2:
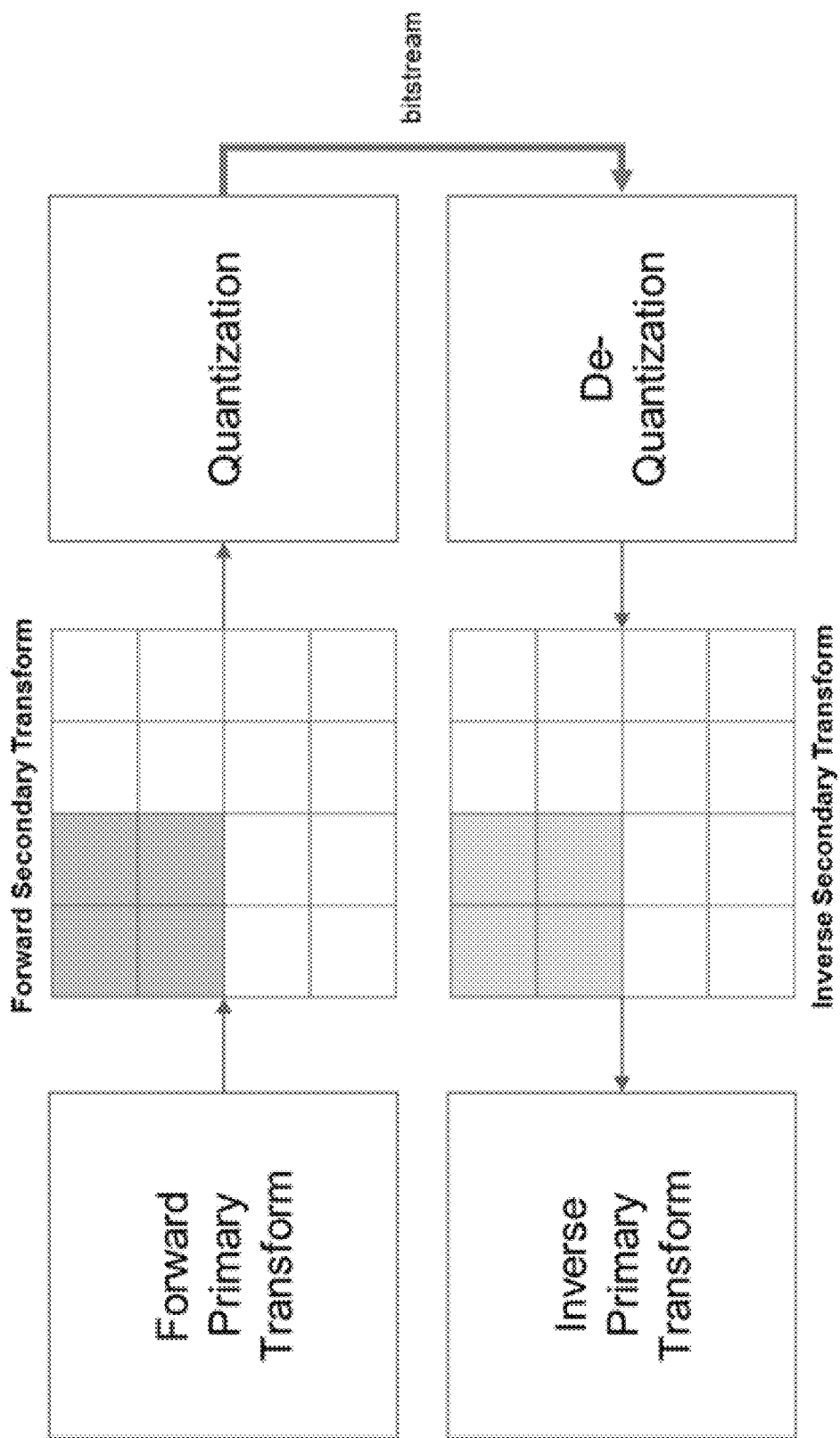
FIG. 2 shows an example of a secondary transform in Joint Exploration Model.

In JEM, secondary transform is applied between forward primary transform and quantization (at encoder) and between de-quantization and invert primary transform (at decoder side). As shown in FIG. 2, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.2.2.2. Reduced Secondary Transform (RST) in JVET-N0193

Figure 3:
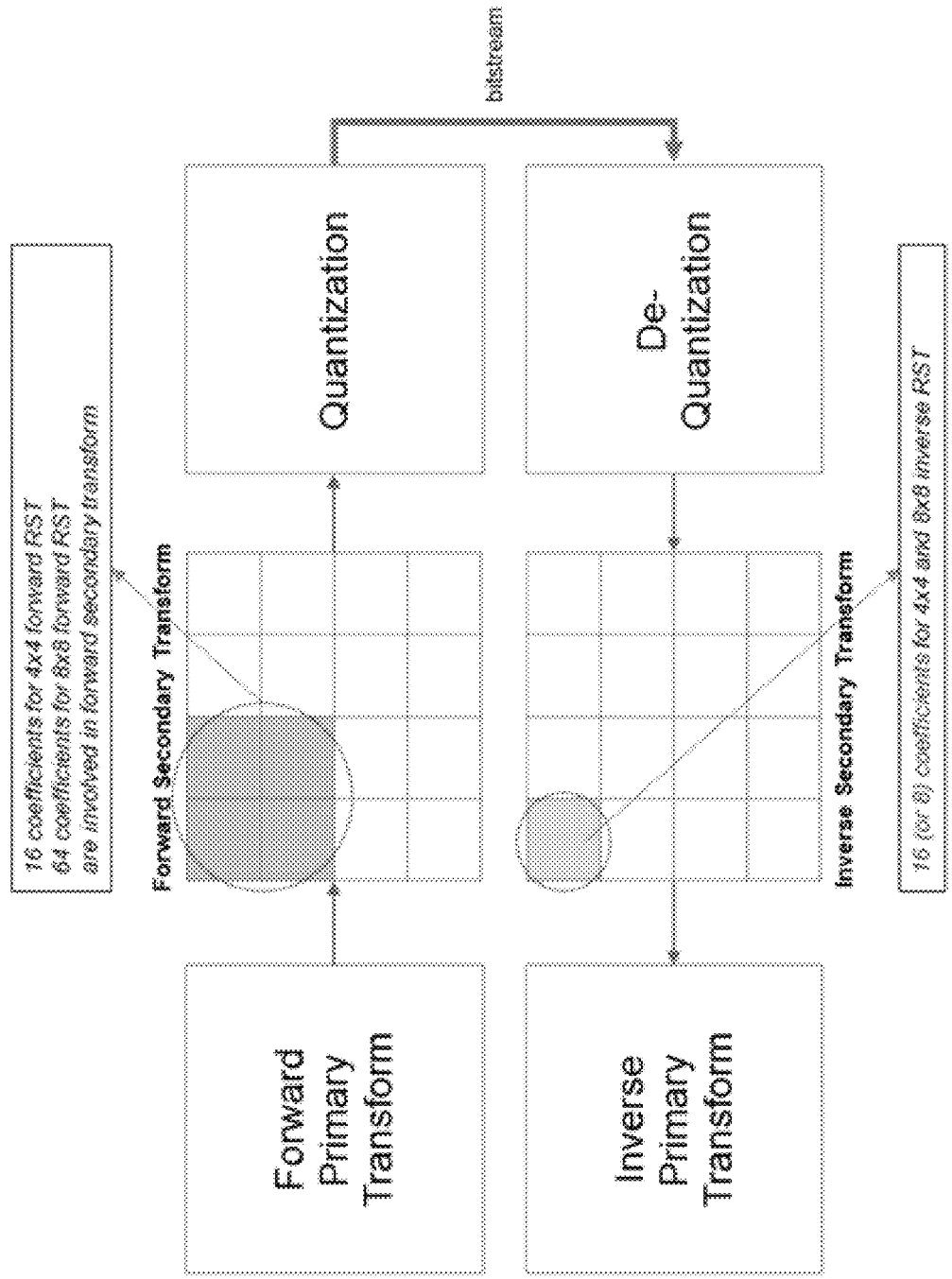
FIG. 3 shows an example or reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 3 shows an example of RST.

2.2.2.2.1. RST Computation

The main idea of a Reduced Transform (RT) is to map an N dimensional vector to an R dimensional vector in a different space, where R/N (R<N) is the reduction factor.

Figure 4:
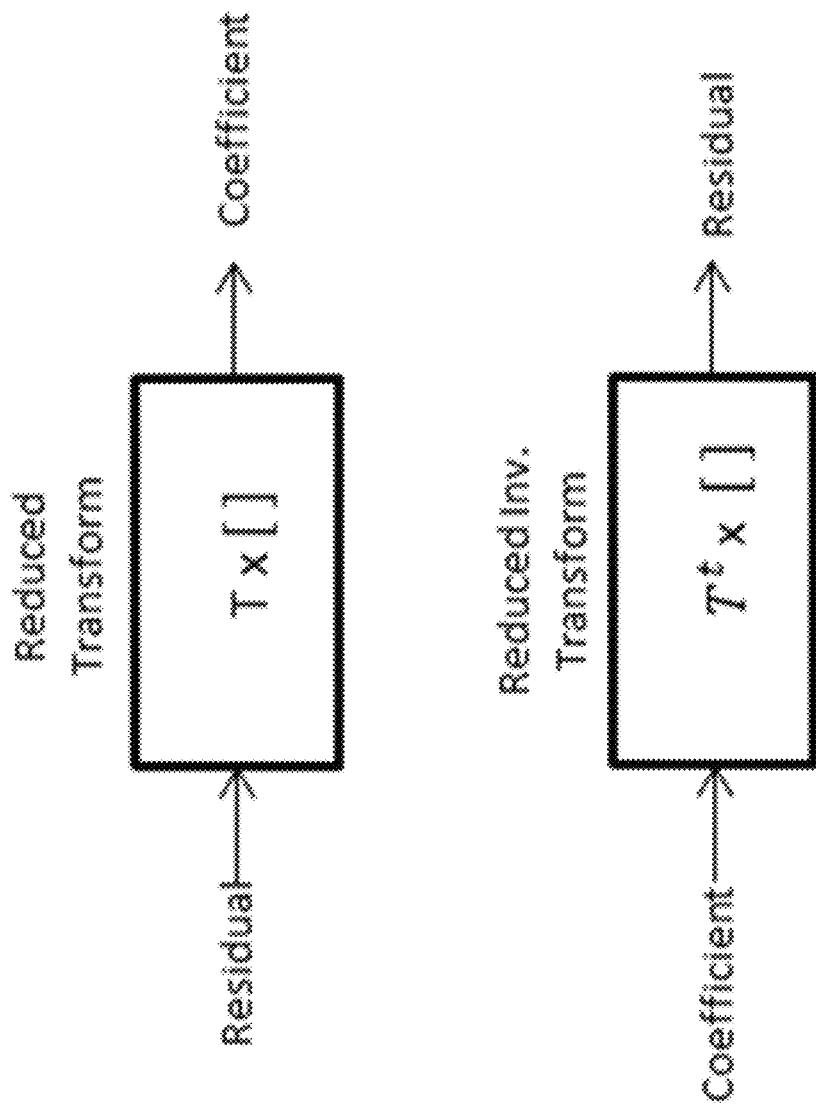
FIG. 4 shows examples of forward and invert reduced transforms.

The RT matrix is an R×N matrix as follows:

$$T_{RxN} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The invert transform matrix for RT is the transpose of its forward transform. The forward and invert RT are depicted in FIG. 4.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (N) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.2.2.2.2. Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.2.2.2.3. RST Selection

An RST matrix is chosen from four transform sets, each of which consists of two transforms. Which transform set is applied is determined from intra prediction mode as the following:

1) If one of three CCLM modes is indicated, transform set 0 is selected.

2) Otherwise, transform set selection is performed according to the Table 3.

TABLE 3

The transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access the Table, denoted as IntraPredMode, have a range of [−14, 83], which is a transformed mode index used for wide angle intra prediction.

2.2.2.2.4. RST Matrices of Reduced Dimension

Figure 5:
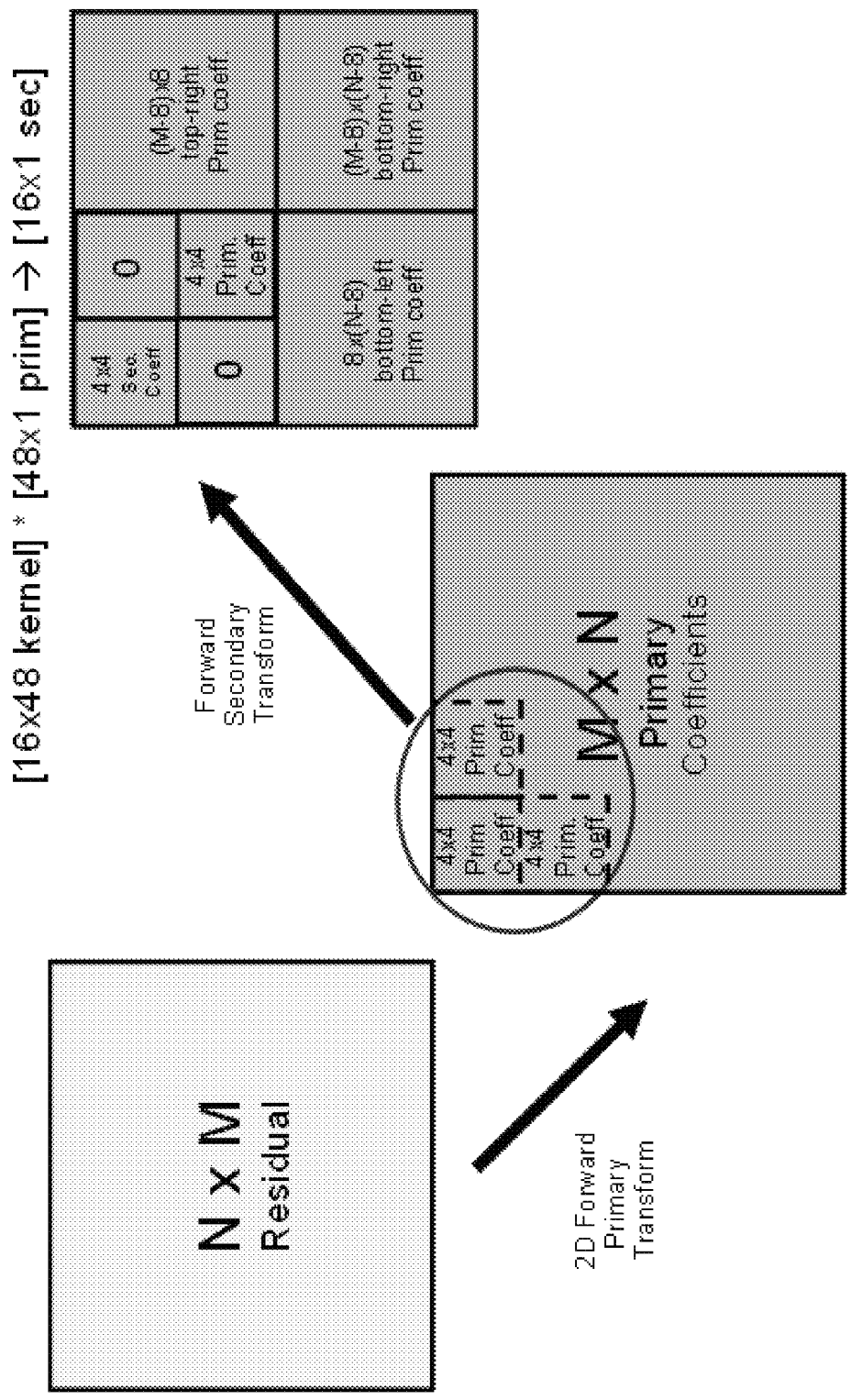
FIG. 5 shows an example of forward RST 8×8 process with 16×48 matrix.

As a further simplification, 16×48 matrices are applied instead of 16×64 with the same transform set configuration, each of which takes 48 input data from three 4×4 blocks in a top-left 8×8 block excluding right-bottom 4×4 block (FIG. 5).

FIG. 5 shows an example of forward RST8×8 process with 16×48 matrix.

2.2.3. Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case (i.e., SBT is enabled), a part of the residual block is coded with inferred adaptive transform and the other part of the residual block is zeroed out. The SBT is not applied to the combined inter-intra mode and triangular prediction mode.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 6. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

Figure 6:
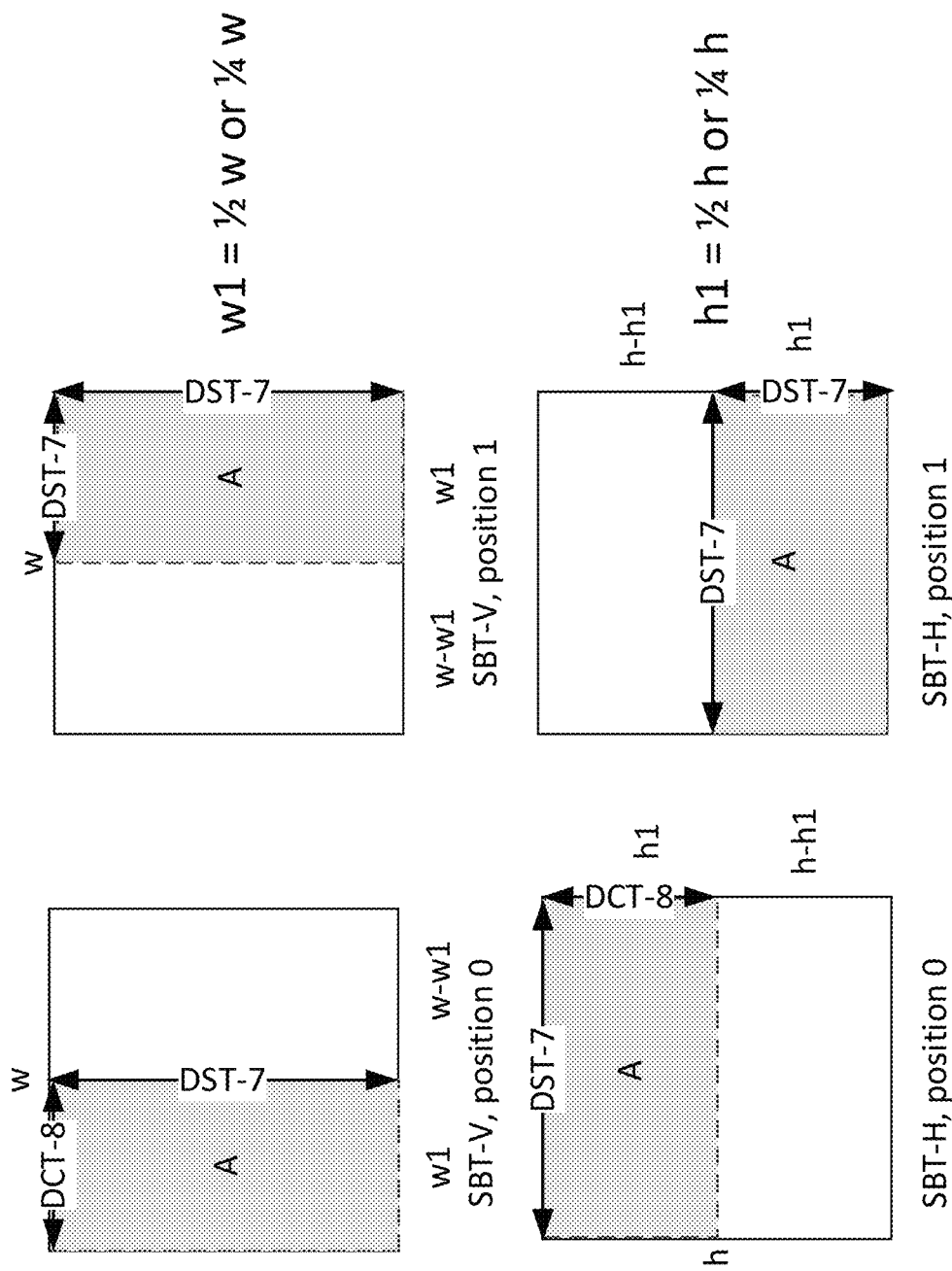
FIG. 6 is an illustration of sub-block transform modes SBT-V and SBT-H.

FIG. 6 is an illustration of sub-block transform modes SBT-V and SBT-H.

2.2.4. Quantized Residual Domain Block Differential Pulse-Code Modulation Coding (QR-BDPCM)

A variance of BDPCM in HEVC, named quantized residual domain BDPCM (denote as QR-BDPCM hereinafter) is employed in VVC. Different from BDPCM, the intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (width)×N (height), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, \quad 0 \le j \le (N-1) \\ Q(r_{i,j}) - Q(r_{(i-1),j}), & 1 \le i \le (M-1), \quad 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), \quad j = 0 \\ Q(r_{i,j}) - Q(r_{i,(j-1)}), & 0 \le i \le (M-1), \quad 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$. For vertical prediction case, $$Q(r_{i,j}) = \Sigma_{k=0}{}^{i} \tilde{r}_{k,j}, 0 \le i \le (M-1), 0 \le j \le (N-1).$$

For horizontal case, $$Q(r_{i,j}) = \Sigma_{k=0}{}^{j} \tilde{r}_{i,k}, 0 \le i \le (M-1), 0 \le j \le (N-1).$$

The invert quantized residuals, $Q^{-1}(Q(r_{i,j}))$, are added to the intra block prediction values to produce the reconstructed sample values.

Transform skip is always used in the QR-BDPCM.

2.3. Entropy Coding of Coefficients 2.3.1. Coefficients Coding of Transform-Applied Blocks In HEVC, transform coefficients of a coding block are coded using non-overlapped coefficient groups (CG, or subblocks), and each CG contains the coefficients of a 4×4 block of a coding block. The CGs inside a coding block, and the transform coefficients within a CG, are coded according to pre-defined scan orders.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 7 and FIG. 8, respectively.

FIG. 7 shows a diagonal up-right scan order (4×4 as a CG for example).

Figure 8:
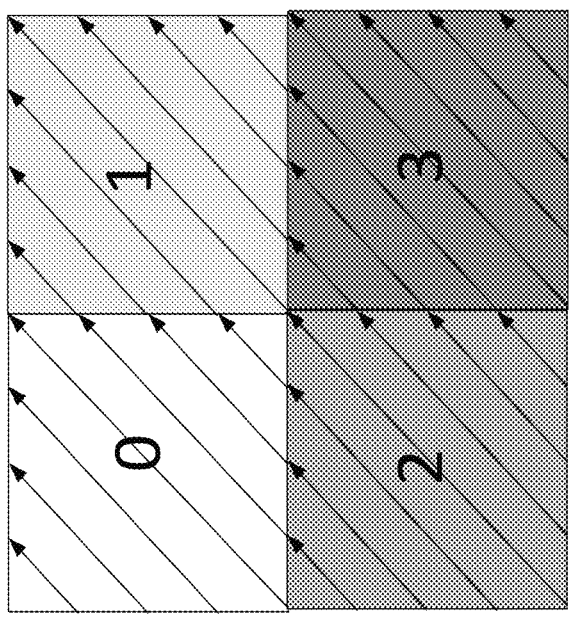
FIG. 8 shows a diagonal up-right scan of 8×8 block (CG size: 4×4) example.

FIG. 8 shows a diagonal up-right scan of 8×8 block (CG size: 4×4) example.

Note that the coding order is the reversed scanning order (i.e., decoding from CG3 to CG0 in FIG. 8), when decoding one block, the last non-zero coefficient's coordinate is firstly decoded.

The coding of transform coefficient levels of a CG with at least one non-zero transform coefficient may be separated into multiple scan passes. In the VVC 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff_flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), code-Value is set equal to absLevel[k].

The value of codeValue is coded using a Golomb-Rice code with Rice parameter ricePar.

2.3.1.1. Context Modeling for Coefficient Coding

The selection of probability models for the syntax elements related to absolute values of transform coefficient levels depends on the values of the absolute levels or partially reconstructed absolute levels in a local neighbourhood. The template used is illustrated in FIG. 9.

Figure 9:
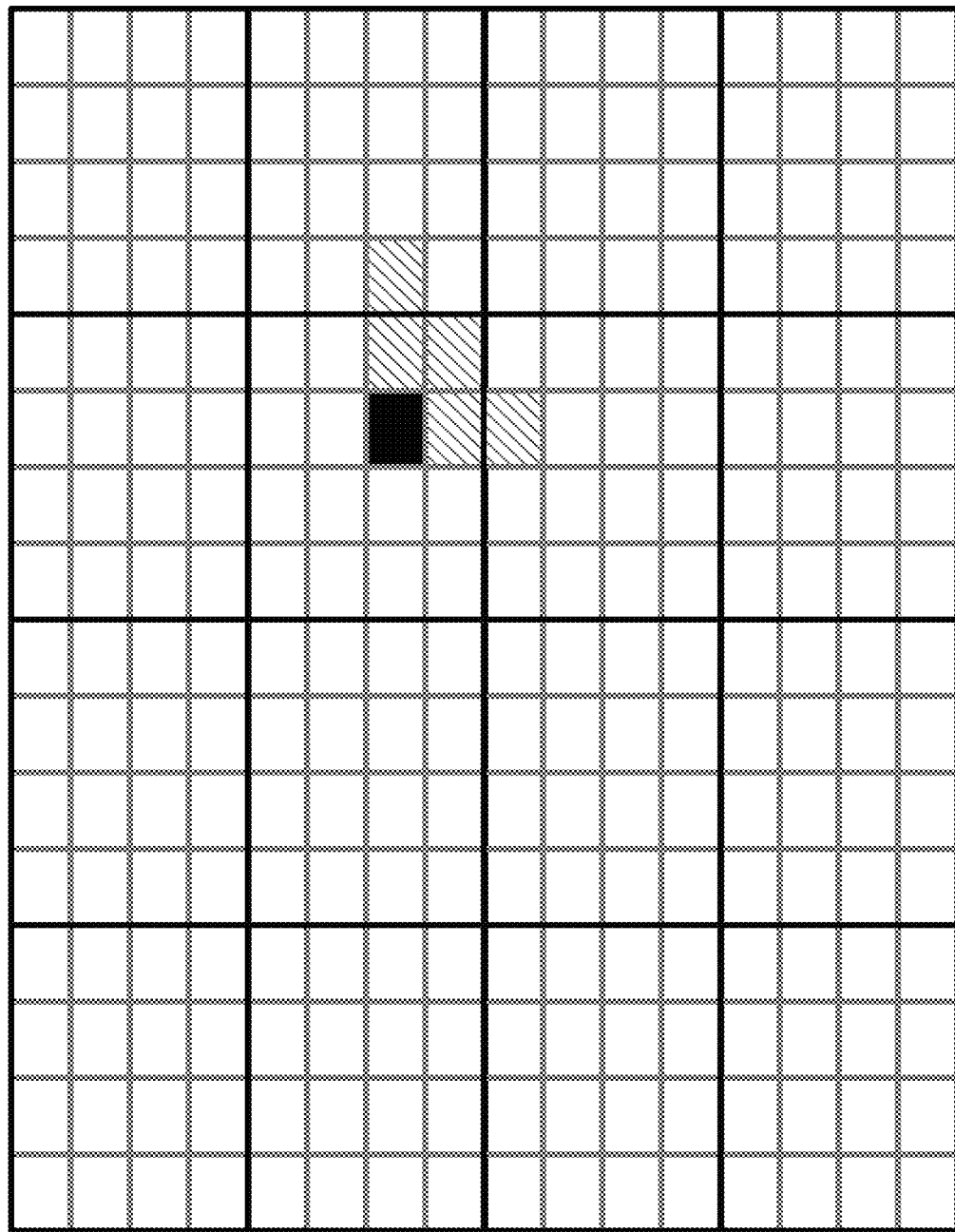
FIG. 9 shows an illustration of the template used for selecting probability models.

FIG. 9 is an illustration of the template used for selecting probability models. The black square specifies the current scan position and the squares shown with pattern represent the local neighbourhood used.

The selected probability models depend on the sum of the absolute levels (or partially reconstructed absolute levels) in a local neighbourhood and the number of absolute levels greater than 0 (given by the number of sig_coeff_flags equal to 1) in the local neighbourhood. The context modelling and binarization depends on the following measures for the local neighbourhood:

numSig: the number of non-zero levels in the local neighbourhood;

sumAbs1: the sum of partially reconstructed absolute levels (absLevel1) after the first pass in the local neighbourhood;

sumAbs: the sum of reconstructed absolute levels in the local neighbourhood diagonal position (d): the sum of the horizontal and vertical coordinates of a current scan position inside the transform block Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.3.1.2. Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 10:
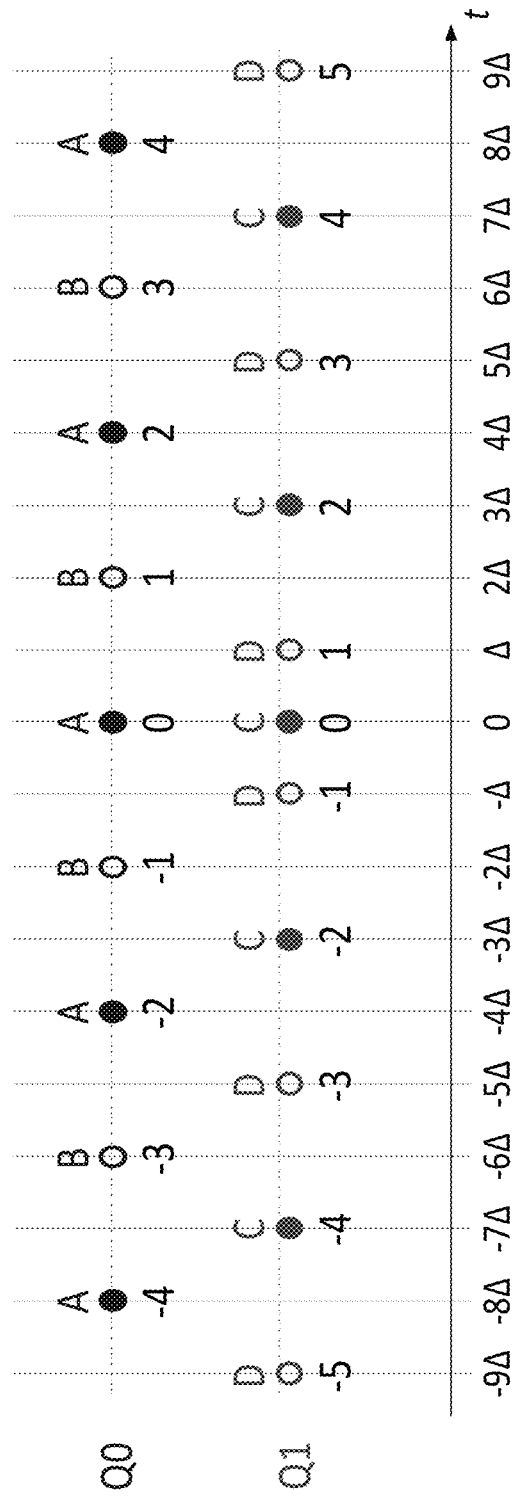
FIG. 10 is an illustration of the two scalar quantizers used in the proposed approach of dependent quantization.

FIG. 10 is an illustration of the two scalar quantizers used in the proposed approach of dependent quantization.

The two scalar quantizers used, denoted by Q0 and Q1, are illustrated in FIG. 10. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 11:
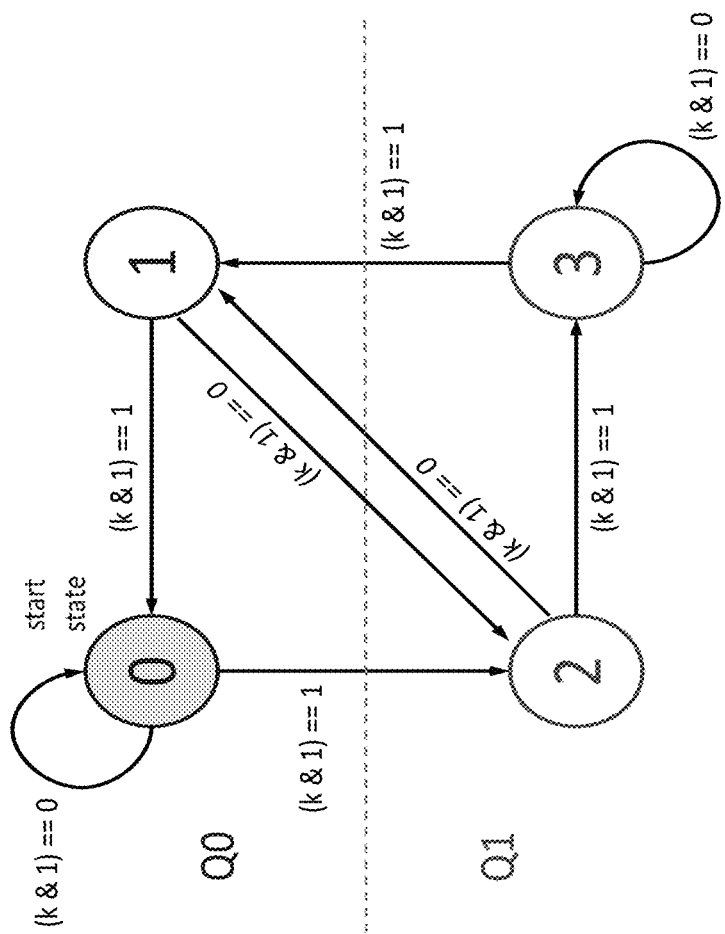
FIG. 11 shows an example of state transition and quantizer selection for the proposed dependent quantization.

FIG. 11 shows an example of state transition and quantizer selection for the proposed dependent quantization.

As illustrated in FIG. 11, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 11, where k denotes the value of the transform coefficient level.

2.3.2. Coefficients Coding of TS-Coded Blocks and QR-BDPCM Coded Blocks

QR-BDPCM follows the context modeling method for TS-coded blocks.

2.3.2.1. Level Mapping and Remapping

If RDPCM is not applied in the current coding unit, the absolute coefficient level, absCoeffLevel, is mapped to a modified level to be coded by the following method that depends on the values of quantized residual samples to the left and above of the current residual sample. Let $X_0$ denote the absolute coefficient level to the left of the current coefficient and let $X_1$ denote the absolute coefficient level of above coefficient. For representing a coefficient with absolute coefficient level absCoeff, a mapped absCoeffMod is coded which is derived as follows:

Level mapping at encoder side wherein absCoeff is the quantized absolute coefficient aid absCoeff Mod is the one to be transmitted in the bitstream:
pred=max(X0, X1),
if (absCoeff==pred)
{
  absCoeff Mod=1;
}
else
{
  absCoeff Mod=(absCoeff<pred)? absCoeff+1: absCoeff;
}

Level remapping at decode side wherein absCoeffMod is the decoded value from the bitstream and absCoeff is the absolute coefficient to be utilized in the dequantization process:
pred=max(X0, X1),
if (absCoeff Mod==1 && pred>0)
{
  absCoeff=absCoeffMod;
}
else if (absCoeff Mod<=pred)
{
  absCoeff=absCoeffMod−1;
}
else
  absCoeff=absCoeffMod;
}

Figure 12:
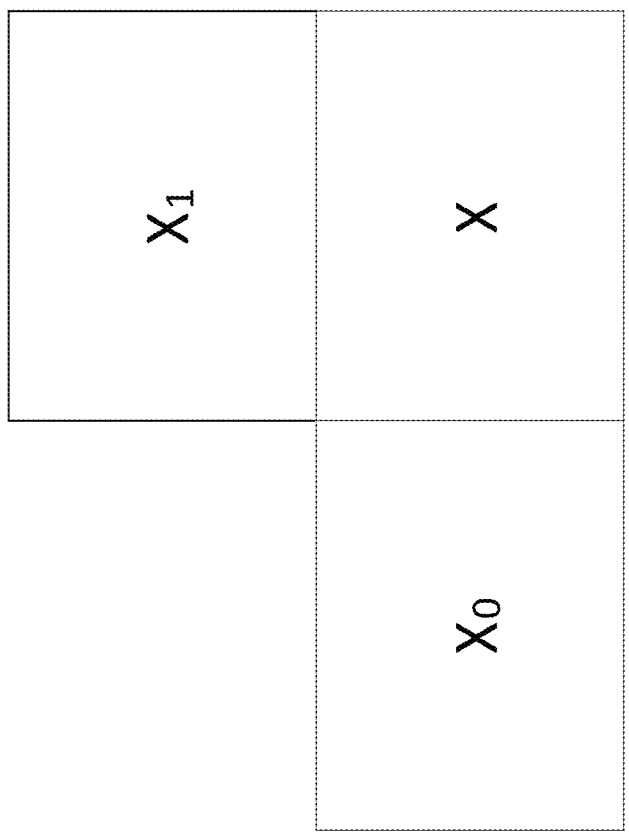
FIG. 12 shows examples of current coefficient value X, neighboring left coefficient value $X_0$ and neighboring above coefficient value $X_1$.

In addition, the context derivation for abs_level_gt1_flag in VTM5.0 is replaced by the following method utilizing the information of above neighboring coefficient and left neighboring coefficient ($X_0$ and $X_1$ in FIG. 12). If RDPCM is not applied in the current coding unit, context offset 0 is used if both $X_0$ and $X_1$ are zeros, context offset 1 is used if only one of the two neighboring coefficients is nonzero, and context offset 2 is used if both $X_0$ and $X_1$ are nonzero. If RDPCM is applied in the current coding unit, context offset 3 is used.

2.3.2.2. Sign Context Modelling

Sign coding context derivation in VTM5.0 is replaced by the following method that utilize the sign information of above neighboring coefficient and left neighboring coefficient to derive the sign coding context offset.

FIG. 12 shows examples of current coefficient value X, neighboring left coefficient value $X_0$ and neighboring above coefficient value $X_1$.

$X_0$ is the left neighboring coefficient value, $X_1$ is above neighboring coefficient value as shown in FIG. 12. If RDPCM is not applied in the current coding unit. context offset 0 is used if both $X_0$ and $X_1$ are zero or nonzero but with opposite signs, context offset 1 is used if both $X_0$ and $X_1$ are non-negative, and context offset 2 is used otherwise. If RDPCM is applied in the current coding unit. context offset 3 is used if both $X_0$ and $X_1$ are zero or nonzero but with opposite signs, context offset 4 is used if both $X_0$ and $X_1$ are non-negative, and context offset 5 is used otherwise This can be summarized by the following table.

|  | $(X_0, X_1)$ | Context offset |
|---|---|---|
| intra_bdpcm_flag == 0 | (0, 0), (+, −), (−, +) | 0 |
|  | (+, +), (+, 0), (0, +) | 1 |
|  | (−, −), (−, 0), (0, −) | 2 |
| intra_bdpcm_flag == 1 | (0, 0), (+, −), (−, +) | 3 |
|  | (+, +), (+, 0), (0, +) | 4 |
|  | (−, −), (−, 0), (0, −) | 5 |

2.3.2.3. Coding Passes

A modified transform coefficient level coding for the TS residual. Multiple passes are applied to code each CG if it contains non-zero coefficients:

$1^{st}$ pass: code the greater than 0 flag (sig_coeff_flag), sign flag (coeff_sign_flag), greater than 1 (abs_level_gtx_flag[0]), and parity flag (par_level_flag), if needed $2^{nd}$-$5^{th}$ passes:

For the j-th pass, code the greater than (2*j) flag (abs_level_gtx_flag[j−1])

$6^{th}$ passes: code the remaining part of the magnitude of the coefficient (abs_remainder)

2.3.2.4. Summary of Changes Compared to Non-TS Residual Coding

Relative to the regular residual coding case, the residual coding for TS includes the following changes:
1) no signalling of the last x/y position
2) coded_sub_block_flag coded for every subblock except for the last subblock when all previous flags are equal to 0;
3) sig_coeff_flag context modelling with reduced template, 4) a single context model for abs_level_gtX_flag[0] and par_level_flag,
5) context modeling for the sign flag, additional greater than 5, 7, 9 flags,
6) modified Rice parameter derivation for the remainder binarization
7) a limit for the number of context coded bins per sample, 2 bins per sample within one block.

2.3.2.5. Syntax and Semantics
7.3.8.10 Transform Unit Syntax

|  | Descriptor |
|---|---|
| transform_unit(x0, y0, tbWidth, tbHeight, treeType, subTuIndex, chType) { | |
|   if( ( treeType = = SINGLE_TREE || treeType = = | |
|     DUAL_TREE_CHROMA ) && ChromaArrayType != 0) { | |
|     if( ( IntraSubPartitionsSplitType = = ISP_NO_SPLIT && | |
|      !( cu_sbt_flag && ( ( subTuIndex = = 0 && cu_sbt_pos_flag ) || | |
|       ( subTuIndex = = 1 && !cu_sbt_pos_flag ) ) ) ) || | |
|     ( IntraSubPartitionsSplitType != ISP_NO_SPLIT && | |
|      ( subTuIndex = = NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType = = SINGLE_TREE || treeType = = DUAL_TREE_LUMA ) { | |
|     if( ( IntraSubPartitionsSplitType = = ISP_NO_SPLIT && | |
|      !( cu_sbt_flag && ( ( subTuIndex = = 0 && cu_sbt_pos_flag ) || | |
|       ( subTuIndex = = 1 && !cu_sbt_pos_flag ) ) ) && | |
|      ( CuPredMode[ chType ][ x0 ][ y0 ] = = MODE_INTRA || | |
|       tu_cbf_cb[ x0 ][ y0 ] || tu_cbf_cr[ x0 ][ y0 ] || | |
|       CbWidth[ chType ][ x0 ][ y0 ] > MaxTbSizeY || | |
|       CbHeight[ chType ][ x0 ][ y0 ] > MaxTbSizeY ) ) || | |
|      ( IntraSubPartitionsSplitType != ISP_NO_SPLIT && | |
|      ( subTuIndex < NumIntraSubPartitions − 1 || !InferTuCbfLuma ) ) ) | |
|      tu_cbf_luma[ x0 ][ y0 ] | ae(v) |
|     if (IntraSubPartitionsSplitType != ISP_NO_SPLIT) | |
|      InferTuCbfLuma = InferTuCbfLuma && !tu_cbf_luma[ x0 ][ y0 ] | |
|   } | |
| ... | |
|   if( tu_cbf_luma[ x0 ][ y0 ] ) { | |
|     if( !transform_skip_flag[ x0 ][ y0 ]) | |
|      residual_coding( x0, y0, Log2( tbWidth ), Log2( tbHeight), 0 ) | |
|     else | |
|      residual_ts_coding( x0, y0, Log2( tbWidth ), Log2( tbHeight), 0) | |
|   } | |
|   if( tu_cbf_cb[ x0 ][ y0 ] ) | |
|     residual_coding( xC, yC, Log2( wC ), Log2( hC ), 1 ) | |
|     if( tu_cbf_cr[ x0 ][ y0 ] && | |
|      !( tu_cbf_cb[ x0 ][ y0 ] && tu_joint_cbcr_residual_flag[ x0 ][ y0 ] )) { | |
|      residual_coding( xC, yC, Log2( wC ), Log2( hC ), 2) | |
|     } | |
| } | |

7.3.8.11 Residual Coding Syntax

|  | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2 ) | |
|   numSbCoeff = 1 << ( log2SbSize << 1 ) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 <<log2TbWidth )* ( 1<< log2TbHeight ) | |
|   for( i =0; i <= lastSubBlock, i++) { | |
|     xS = DiagScanOrder[ log2TbWidth − log2SbSize ][ log2TbHeight − log2SbSize ][ i ][ 0 ] | |
|     yS = DiagScanOrder[ log2TbWidth − log2SbSize ][ log2TbHeight − log2SbSize ][ i ][ 1 ] | |
|     if( ( i != lastSubBlock || !inferSbChf ) { | |
|      coded_sub_block_flag[ xS ][ yS ] | ae(v) |
|     } | |
|     if( coded_sub_block_flag[ xS ][ yS ] && i < lastSubBlock ) | |
|      inferSbCbf = 0 | |

|  | Descriptor |
|---|---|
| /* First scan pass */ | |
|   inferSbSigCoeffFlag = 1 | |
|   for( n =0; n <=numSbCoeff - 1; n++) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder + log2SbSize ][ log2SbSize ][ n][ 1 ] | |
|     if( coded_sub_block_flag[ xS ][ yS ] && | |
|      ( n != numSbCoeff - 1 \| \| !inferSbSigCoeffFlag ) ) { | |
|       sig_coeff_flag[ xC][ yC ] | ae(v) |
|       MaxCcbs- - | |
|      if( sig_coeff_flag[ xC ][ yC ]) | |
|       inferSbSigCoeffFlag = 0 | |
|     } | |
|     CoeffSignLevel[ xC ][ yC ] = 0 | |
|     if( sig_coeff_flag[ xC ][ yC ] { | |
|       coeff_sign_flag[ n ] | ae(v) |
|       MaxCcbs- - | |
|       CoeffSignLevel[ xC ][ yC ] = ( coeff_sign_flag[ n ] > 0 ? -1 : 1) | |
|       abslevel_gtx flag[ n ][ 0 ] | ae(v) |
|       MaxCcbs- - | |
|       if( abs_level_gtx_flag[ n ][ 0 ] ) { | |
|         par level_flag[ n ] | ae(v) |
|         MaxCcbs- - | |
|       } | |
|     } | |
|     AbsLevelPassX[ xC ][ yC ] = | |
|       sig_coeff_flag[ xC][ yC] + par_level_flag[ n ] + abs_level_gtx_flag[ n ][ 0 ] | |
|   } | |
| /* Greater than X scan pass (numGtXFlags=5) */ | |
|   for( n = 0; n <= numSbCoeff - 1; n++) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     for( j= 1; j < 5; j++ ) { | |
|      if( abs_level_gtx_flag[ n ][ j - 1 ] ) | |
|       abs_level_gtx_flag[ n ][ j ] | ae(v) |
|      MaxCcbs- - | |
|      AbsLevelPassX[ xC ][ yC ] + = 2 * abs_level_gtx_flag[ n ][ j ] | |
|     } | |
|   } | |
| /* remainder scan pass */ | |
|   for( n = 0; n <= numSbCoeff - 1; n++) { | |
|     xC = ( xS << log2SbSize ) + DiagScanOrder[ log2SbSize ][ log2SbSize ][ n ][ 0 ] | |
|     yC = ( yS <<log2SbSize ) + DiagScanOrder[ log2SbSize ][ log2SbSize ][ n][ 1 ] | |
|     if( abs_level_gtx_flag[ n ][ 4 ] ) | |
|      abs_remainder[ n ] | ae(v) |
|     if( intra_bdpcm_flag = = 0 ) { | |
|      absRightCoeff = abs( TransCoeffLevel[ x0 ][ y0 ][ cIdx ][ xC - 1 ][ yC ] ) | |
|      absBelowCoeff = abs( TransCoeffLevel[ x0 ][ y0 ][ cIdx ][ xC ][ yC - 1 ] ) | |
|      predCoeff = Max( absRightCoeff, absBelowCoeff ) | |
|      if( AbsLevelPassX[ xC ][ yC ] + abs_remainder[ n ] = = 1 && predCoeff > 0 ) | |
|       TransCoeffLevel[ x0 ][ y0 ][ cIdx ][ xC ][ yC ] = ( 1 - 2 * coeff_sign_flag[ n ] ) * predCoeff | |
|      else if( AbsLevelPassX[ xC ][ yC ] + abs_remainder[ n ] <= predCoeff) | |
|       TransCoeffLevel[ x0 ][ y0 ][ cIdx ][ xC ][ yC ] = ( 1 - 2 * coeff_sign_flag[ n ] )* ( AbsLevelPassX[ xC ][ yC ] + abs_remainder[ n ] - 1) | |
|      else | |
|       TransCoeffLevel[ x0 ][ y0 ][ cIdx ][ xC ][ yC + = ( 1 - 2 * coeff_sign_flag[ n ] ) * ( AbsLevelPassX[ xC ][ yC ] + abs_remainder[ n ] ) | |
|     } else | |

-continued

| | Descriptor |
|---|---|
| `TransCoeffLevel[ x0 ][ y0 ][ cIdx ][ xC ][ yC ] = ( 1 − 2 *`<br>`coeff_sign_flag[ n ] ) *`<br>`        ( AbsLevelPassX[ xC ][ yC ] + abs_remainder[ n ] )`<br>`      }`<br>`    }`<br>`}` | |

The number of context coded bins is restricted to be no larger than 2 bins per sample for each CG.

TABLE 9-15

Assignment of ctxInc to syntax elements with context coded bins

| Syntax element | binIdx | | | | | |
|---|---|---|---|---|---|---|
| | 0 | 1 | 2 | 3 | 4 | >= 5 |
| last_sig_coeff_x_prefix | | 0..23 (clause 9.5.4.2.4) | | | | |
| last_sig_coeff_y_prefix | | 0..23 (clause 9.5.4.2.4) | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag [ ] [ ] | (MaxCcbs > 0) ? ( 0..7 (clause 9.5.4.2.6)) : bypass | na | na | na | na | na |
| sig_coeff_flag[ ] [ ] | (MaxCcbs > 0) ? ( 0..93 (clause 9.5.4.2.8)) : bypass | na | na | na | na | na |
| par_level_flag[ ] | (MaxCcbs > 0) ? ( 0..33 (clause 9.5.4.2.9)) : bypass | na | na | na | na | na |
| abs_level_gtx_flag[ ] [ i ] | 0..70 (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] transform_skip [x0][y0] == 0 | bypass | na | na | na | na | na |
| coeff_sign_flag[ ] transform_skip [x0][y0] == 1 | 0 | na | na | na | na | na |

2.4. Palette Mode in HEVC Screen Content Coding Extensions (HEVC-SCC)

2.4.1. Concept of Palette Mode

Figure 13:
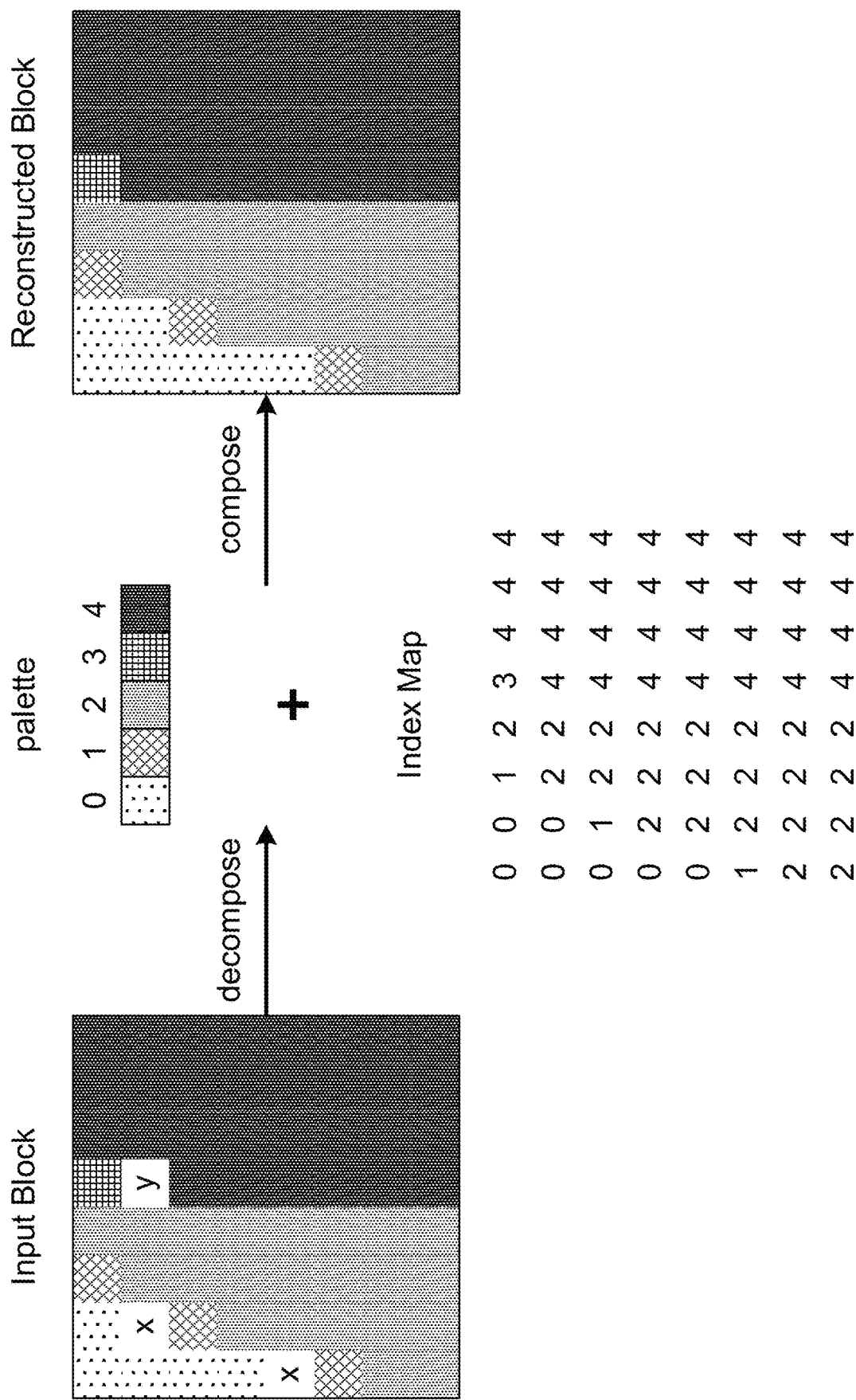
FIG. 13 shows an example of a block coded in palette mode.

The basic idea behind a palette mode is that the pixels in the CU are represented by a small set of representative colour values. This set is referred to as the palette. And it is also possible to indicate a sample that is outside the palette by signalling an escape symbol followed by (possibly quantized) component values. This kind of pixel is called escape pixel. The palette mode is illustrated in FIG. 13. As depicted in FIG. 13, for each pixel with three color components (luma, and two chroma components), an index to the palette is founded, and the block could be reconstructed based on the founded values in the palette. In FIG. 13, the blocks marked "x" indicates that those regions of the input block have sample values in between palette values 0 and 1, and the block marked "y" indicates that that region of the input block has a sample value in between palette values 3 and 4.

FIG. 13 shows an example of a block coded in palette mode.

2.4.2. Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the PPS. When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signalled in the PPS. In HEVC-SCC, a palette predictor initializer of size 0 was enabled to allow explicit disabling of the palette predictor initialization at the PPS level.

Figure 14:
FIG. 14 illustrates use of palette predictor to signal palette entries.

For each entry in the palette predictor, a reuse flag is signalled to indicate whether it is part of the current palette. This is illustrated in FIG. 14. The reuse flags are sent using run-length coding of zeros. Afterthis, the number of new palette entries are signalled using Exponential Golomb (EG) code of order 0, i.e., EG-0. Finally, the component values for the new palette entries are signalled.

FIG. 14 illustrates use of palette predictor to signal palette entries.

2.4.3. Coding of Palette Indices

The palette indices are coded using horizontal and vertical traverse scans as shown in FIG. 15. The scan order is explicitly signalled in the bitstream using the palette_transpose_flag. For the rest of the subsection it is assumed that the scan is horizontal.

FIG. 15 shows examples of horizontal and vertical traverse scans.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT' and 'COPY_ABOVE' modes, a run value is signaled which specifies the number of subsequent samples that are also coded using the same mode.

Figure 16:
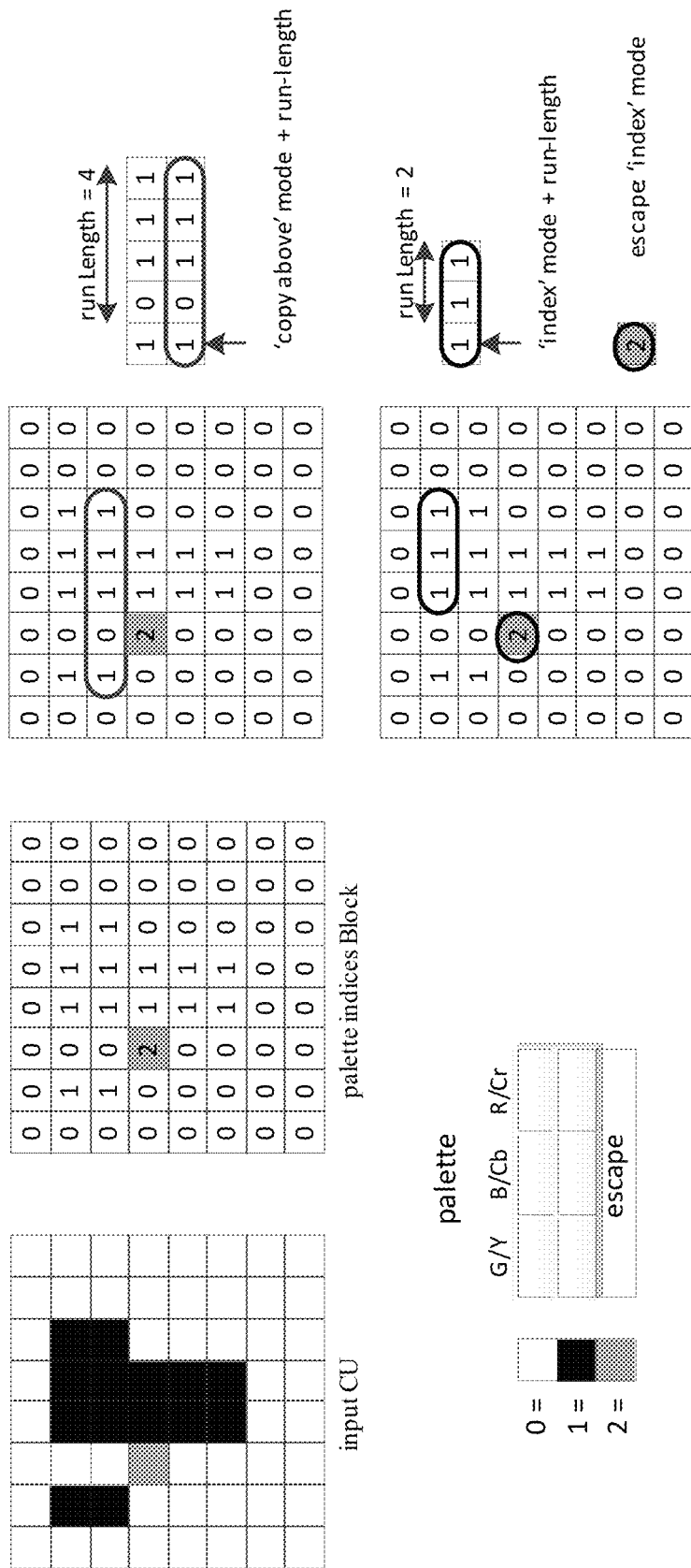
FIG. 16 shows example coding of palette indices.

In the palette mode, the value of an index for the escape sample is the number of palette entries. And, when escape symbol is part of the run in 'COPY_LEFT' or 'COPY_ABOVE' mode, the escape component values are signaled for each escape symbol. The coding of palette indices is illustrated in FIG. 16.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode. The binarization of escape samples is EG coding with $3^{rd}$ order, i.e., EG-3.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In addition, there is a index adjustment process in the palette index coding. When signaling a palette index, the left neighboring index or the above neighboring index should be different from the current index. Therefore, the range of the current palette index could be reduced by 1 by removing one possibility. After that, the index is signaled with truncated binary (TB) binarization.

The texts related to this part is shown as follows, where the CurrPaletteIndex is the current palette index and the adjusted RefPaletteIndex is the prediction index.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive.

The variable adjustedRefPaletteIndex is derived as follows:

```
adjustedRefPaletteIndex=MaxPaletteIndex+1
if(PaletteScanPos>0) {
  xcPrev=
  x0+TraverseScanOrder[log 2CbWidth][log 2bHeight][PaletteScanPos−1][0]
  ycPrev=
  y0+TraverseScanOrder[log 2CbWidth][log 2bHeight][PaletteScanPos−1][1]
  if(CopyAboveIndicesFlag[xcPrev][ycPrev]==0) {
    adjustedRefPaletteIndex=PaletteIndexMap[xcPrev][ycPrev] {(7-157)
  }
  else {
    if(!palette_transpose_flag)
      adjustedRefPaletteIndex=PaletteIndexMap[xC][yC−1]
    else
      adjustedRefPaletteIndex=PaletteIndexMap[xC−1][yC]
  }
}
```

When CopyAboveIndicesFlag[xC][yC] is equal to 0, the variable CurrPaletteIndex is derived as follows:

```
if(CurrPaletteIndex>=adjustedRefPaletteIndex)
  CurrPaletteIndex++
```

2.4.4. Palette Mode in VVC 2.4.4.1. Palette in Dual Tree

In VVC, the dual tree coding structure is used on coding the intra slices, so the luma component and two chroma components may have different palette and palette indices. In addition, the two chroma component shares same palette and palette indices.

2.4.4.2. Palette as a Separate Mode

In JVET-N0258 and current VTM, the prediction modes fora coding unit can be MODE_INTRA, MODE_INTER, MODE_IBC and MODE_PLT. The binarization of prediction modes is changed accordingly.

When IBC is turned off, on I tiles, the first one bin is employed to indicate whether the current prediction mode is MODE_PLT or not. While on P/B tiles, the first bin is employed to indicate whether the current prediction mode is MODE_INTRA or not. If not, one additional bin is employed to indicate the current prediction mode is MODE_PLT or MODE_INTER.

When IBC is turned on, on I tiles, the first bin is employed to indicate whether the current prediction mode is MODE_IBC or not. If not, the second bin is employed to indicate whether the current prediction mode is MODE_PLT or MODE_INTRA. While on P/B tiles, the first bin is employed to indicate whether the current prediction mode is MODE_INTRA or not. If it's an intra mode, the second bin is employed to indicate the current prediction mode is MODE_PLT or MODE_INTRA. If not, the second bin is employed to indicate the current prediction mode is MODE_IBC or MODE_INTER.

3. TECHNICAL PROBLEMS SOLVED BY EMBODIMENTS

The current design has the following problems:
1. The current design of level mapping/remapping will disallow the decoded coefficients to be equal to zero since the remapping process is always performed.
    a. For example, if the decoded AbsLevelPassX[xC][yC]+abs_remainder[n] is equal to 0, even the decoded significant flag is equal to 0, the TransCoeffLevel will be reset to −1, according to sub-clause 7.3.8.11.
  b. Meanwhile, the mapping process shall only be applied to non-zero coefficients, such a encoder constraint may be required. Otherwise, the same value '1' may be interpreted in different ways, either coefficient equal to 0 or equal to the predictor.
 2. The context modeling of sign flags/greater-than-one flags depend on the two spatial neighbors. However, for different coding blocks, the correlation relative to the spatial neighbors may be weaker compared to those next to current one in the scanning order.
 3. The palette index coding is purely based on information from either above sample or left sample. The relationship between both above and left neighbors are not well utilized.
 4. According to our analysis, the correlation of current coefficient and neighboring coefficient for different contexts are as follows:

| | context and probability correlation of sign flags | | |
|---|---|---|---|
| $(X_0, X_1)$ | Context offset | Meaning | Probability of current sign flag |
| (0, 0), (+, −), (−, +) | 0 | Neighbours' sign values are mixed with '0' and '1' | P('0') = 47% |
| (+, +), (+, 0), (0, +) | 1 | Neighbours' sign values are all '0's if coefficient is not zero | P('0') = 95% |
| (−, −), (−, 0), (0, −) | 2 | Neighbours' sign values are all'1's if coefficient is not zero | P('0') = 5% |

As it could be seen, the same bin value may be associated with different probabilities under different context. When the associated probability is relatively low (such as context offset equal to 2), the efficiency of context coded bin is also less.

4. EXAMPLE EMBODIMENTS AND TECHNIQUES

The listing of items below should be considered as examples to explain general concepts. These items should not be interpreted in a narrow way. Furthermore, these items can be combined in any manner.

In the following discussion, a CU may comprise information associated to all the three-color components with the single tree coding structure. Or a CU may comprise information only associated to the luma color component with the mono-color coding. Or a CU may comprise information only associated to the luma color component (e.g., Y component in YCbCr format or G component in GBR format) with the dual tree coding structure. Or a CU may comprise information only associated to the two chroma components (e.g., Cb and Cr components in YCbCr format or B and R components in GBR format) with the dual-tree coding structure.

In the following description, a "block" may refer to coding unit (CU) or a transform unit (TU) or coding block (CB) or transform block (TB).
Related to Enable Level Mapping/Remapping
 1. Whether to enable level mapping (at encoder side) or level remapping (at decoder side) process for a decoded residual coefficient may depend on whether the decoded value is unequal to 0.
  a. In one example, when the decoded value (e.g., AbsLevelPassX[xC][yC] or sig_coeff_flag[xC][yC] or AbsLevelPassX[xC][yC]+abs_remainder[n]) is equal to 0, the level mapping/remapping process is skipped.
  b. In one example, the level mapping/remapping process is invoked under the condition that when the decoded value (e.g., AbsLevelPassX[xC][yC] or sig_ coeff_flag[xC][yC] or AbsLevelPassX[xC][yC]+abs_remainder[n]) is unequal to 0.
  c. In one example, a conformance bitstream shall satisfy that when the quantized value or the value to be coded before level mapping is equal to 0, the coded significant flag (e.g., sig_coeff_flag) shall be equal to 0.
 2. Whether to enable level mapping (at encoder side) or level remapping (at decoder side) process may depend on decoded residual information of current block and/or neighboring (adjacent or non-adjacent block).
  a. In one example, whether to apply level remapping is derived on-the-fly in addition to the condition that current block is coded with non-BDPCM TS mode.
 3. Whether to enable level mapping (at encoder side) or level remapping (at decoder side) process may depend on side information signaled in a video unit.
  a. In one example, a flag may be signaled to indicate whether at least one decoded value should be remapped before being used to reconstruct the current block.
  b. In one example, the video unit is a sub-region of a CTU (e.g., VPDU)/CTU/CTB/multiple CTUs/multiple CUs/CTU row/tile/brick/slice/picture/sub-picture/sequence/view, etc. al.
  c. In one example, whether to enable the proposed methods and/or how to enable the proposed methods may be signaled in sequence parameter set/view parameter set/Adaptation parameter set/picture parameter set/picture header/slice header/CU/PU/TU/CTU/CTB, etc. al.
 4. Whether to enable level mapping (at encoder side) or level remapping (at decoder side) process may depend on color format/color component.
  a. For example, level mapping (at encoder side) or level remapping (at decoder side) process may only be applied on the luma component but not on the chroma components.
  b. For example, level mapping (at encoder side) or level remapping (at decoder side) process may only be applied on the luma component but not on the chroma components when the color forma is 4:2:0.
  c. For example, level mapping (at encoder side) or level remapping (at decoder side) process may only be applied chromate all color components when the color format is 4:4:4 or separate color plane coding is used.
 5. Whether to enable level mapping (at encoder side) or level remapping (at decoder side) process may depend on block dimensions W×H.
  a. For example, level mapping (at encoder side) or level remapping (at decoder side) process is not enabled if W*H>=T1 or W*H>T1.
  b. For example, level mapping (at encoder side) or level remapping (at decoder side) process is not enabled if W*H<=T1 or W*H<T1.
  c. For example, level mapping (at encoder side) or level remapping (at decoder side) process is not enabled if Min(W, H)>=T1 or Min(W, H)>T1.

d. For example, level mapping (at encoder side) or level remapping (at decoder side) process is not enabled if Max(W, H)<=T1 or Max(W, H)<T1.
e. For example, level mapping (at encoder side) or level remapping (at decoder side) process is not enabled if Min(W, H)<=T1 or Min(W, H)<T1.
f. For example, level mapping (at encoder side) or level remapping (at decoder side) process is not enabled if Max(W, H)>=T1 or Max(W, H)>T1.
g. For example, level mapping (at encoder side) or level remapping (at decoder side) process is not enabled if W>=T1 and H>=T2.
h. For example, level mapping (at encoder side) or level remapping (at decoder side) process is not enabled if W<=T1 and H<=T2.
i. T1 and T2 are integers in the above bullets.
6. Instead of using the two spatially neighboring decoded coefficients (left or above) to decide the predictor used in the level mapping/remapping process, it is proposed to use one or multiple decoded coefficients according to the decoding/scanning order.
a. In one example, the most-recently K decoded coefficients are utilized.
b. In one example, the K decoded coefficients among the most-recently M (M>K) decoded coefficients are utilized.
c. In one example, K may be pre-defined or signalled.
d. In one example, K may be derived on-the-fly based on decoded information.
e. In one example, K may depend on how many coefficients have already been decoded.
  i. For example, S coefficients have already been decoded. Then K is derived as K=Min(S, M), where M is a fixed number such as 2.

Related to Syntax Elements
7. A syntax element may be coded to indicate whether a subset of absolute coefficients within a video unit are all greater than M wherein M is an integer.
a. In one example, the video unit is a coefficient group (CG, e.g., 4×4)/a transform block/a transform unit/a prediction block/a coding block.
b. In one example, the subset is defined based on the scanning order.
  i. In one example, the subset may include the first L coefficients according to the forward scanning order.
  ii. In one example, the subset may include the last L coefficients according to the forward scanning order, or the first L coefficients according to the decoding order in the video unit.
c. In one example, the subset is defined based on coordinates.
  i. In one example, the subset may include the coefficients in a rectangular region.
  ii. In one example, the subset may include the coefficients in a square region.
d. In one example, the subset is defined based on the coded mode information/block dimension.
  i. In one example, if current block is coded with QR-BDPCM or other variances of BDPCM, and predicted in the vertical direction, the subset is defined to be those in the top-most row.
  ii. In one example, if current block is coded with QR-BDPCM or other variances of BDPCM, and predicted in the horizontal direction, the subset is defined to be those in the left-most column.
e. In one example, M is equal to 0, 1, 2, 3, 4, 5.

Related to Context Modeling
8. The level mapping/remapping concept may be also applicable to other non-TS coded blocks (e.g., BDPCM coded blocks).
a. Alternatively, furthermore, only for residuals located at defined positions, the level mapping/remapping process is applied.
  i. In one example, the defined positions may depend on the prediction direction.
    1) In one example, for the vertical prediction direction, residuals located at the first row may be mapped/remapped.
    2) In one example, for the horizontal prediction direction, residuals located at the first column may be mapped/remapped.
b. Alternatively, furthermore, only for residuals which are not predictively coded, the level mapping/remapping process is applied.
  i. In one example, for the vertical prediction direction, residuals located at the first row may be mapped/remapped.
  ii. In one example, for the horizontal prediction direction, residuals located at the first column may be mapped/remapped.
9. The level mapping/remapping process may be utilized to code palette index or escape symbol coding in palette mode.
a. In one example, based on the max value of previously coded palette index the palette index may be mapped at the encoder side and remapped at the decode side.
b. In one example, the mapping and remapping process may be invoked for all palette coded blocks.
  i. Alternatively, they may be invoked under certain conditions.
10. It is proposed to use a function f (a0, a1, . . . ,) in the context modeling process with parameters ai representing previously coded coefficients/palette index etc. al.
a. In one example, the function f may be defined as the max or min function.
b. Parameters ai may be those in a template covering current sample/coefficient and some neighbors (adjacent or non-adjacent).
  i. In one example, for the palette index coding, the left and above palette index may be both utilized based on the function f to code the index.
c. Parameters ai may be those in a scanning/decoding order relatively to current sample/coefficient.
11. Instead of using the two spatially neighboring decoded coefficients (left or above) for the context modeling of coding sign flags or other syntax elements, it is proposed to use one or multiple decoded coefficients according to the decoding/scanning order.
a. In one example, the most-recently K (e.g., K=2) decoded coefficients are utilized.
b. In one example, the K decoded coefficients among the most-recently M (M>K) decoded coefficients are utilized.
c. In one example, K may be pre-defined or signalled.
d. In one example, K may be derived on-the-fly based on decoded information.
e. In one example, K may depend on how many coefficients have already been decoded.
  i. For example, S coefficients have already been decoded. Then K is derived as K=Min(S, M), where M is a fixed number such as 2.

12. Instead of using the two spatially neighboring decoded coefficients (left or above) for the context modeling of coding sign flags or other syntax elements, it is proposed to use one or multiple decoded coefficients according to the prediction direction.
   a. In one example, for BDPCM coded blocks with vertical prediction direction, the previous decoded coefficients in the same column may be utilized.
   b. In one example, for BDPCM coded blocks with horizontal prediction direction, the previous decoded coefficients in the same row may be utilized.
   c. In one example, for BDPCM coded blocks with vertical prediction direction, the previous decoded coefficients in the same row may be utilized.
   d. In one example, for BDPCM coded blocks with horizontal prediction direction, the previous decoded coefficients in the same column may be utilized.
13. Instead of coding the sign flags with same binarization (e.g., '0' to indicate positive and '1' to indicate negative value), it is proposed to set the sign value dynamically (i.e., the decoded bin value may be interpreted to different semantics), such as based on the information from neighboring blocks or based on the selected context
   a. In one example, at the encoder side, the bin value to be encoded is based on whether the sign information of current coefficient is the same as majority of sign information of previously coded coefficients.
   b. In one example, if the selected context is representing majority of neighbors are negative (e.g., suppose two neighbors are checked, and if both two neighbors are negative, or if one is negative and the other is equal to zero), the decoded bin equal to '1' may indicate positive value and '0' indicates negative value.
      i. Alternatively, furthermore, if the selected context is representing majority of neighbors are positive (e.g., suppose two neighbors are checked, and if both two neighbors are positive, or if one is positive and the other is equal to zero), the decoded bin equal to '0' may indicate positive value and '1' may indicate negative value.
   c. In one example, if the selected context is representing majority of neighbors are negative (e.g., suppose two neighbors are checked, and if both two neighbors are negative, or if one is negative and the other is equal to zero), the decoded bin equal to '0' may indicate positive value and '1' indicates negative value.
      i. Alternatively, furthermore, if the selected context is representing majority of neighbors are positive (e.g., suppose two neighbors are checked, and if both two neighbors are positive, or if one is positive and the other is equal to zero), the decoded bin equal to '1' may indicate positive value and '0' may indicate negative value.

General Usage

14. Indications of whether to enable the proposed methods and/or which bullets to be applied may be signaled in a video unit level.
   a. In one example, the video unit may be tile/brick/slice/picture/sub-picture/sequence/view, etc. al
   b. In one example, whether to enable the proposed methods and/or how to enable the proposed methods may be signaled in sequence parameter set/view parameter set/Adaptation parameter set/picture parameter set/picture header/slice header.
   c. In one example, whether to enable the proposed methods and/or how to enable the proposed methods may be controlled by other syntax elements, such as one syntax element which is used to indicate whether the video content is screen content.
15. Whether to enable the proposed methods and/or how to enable the proposed methods may be dependent on the coding information, such as block dimension, slice type/picture type/temporal layer index/video content/color component/partitioning tree type/coded mode/transform information, etc. al.
   d. In one example, for blocks with width no greater than T1 and height no greater than T2, the proposed method may be applied.
   e. In one example, for blocks with width no greater than T1 or height no greater than T2, the proposed method may be applied.
   f. In one example, for blocks with width times height no greater than T3, the proposed method may be applied.

Some embodiments that use the above listed techniques are described for illustrative purpose.

5. EMBODIMENTS

5.1. Embodiment #1

This embodiment shows an example that whether to enable the level re-mapping process is dependent on the decoded value (e.g., AbsLevelPassX[xC][yC] or sig_coeff_flag[xC][yC] or (AbsLevelPassX[xC][yC]+abs_remainder[n])) is unequal to 0.
The changes compared to VVC WD are highlighted in bold italicized text.
7.3.8.11 Residual Coding Syntax

| | Descriptor |
|---|---|
| residual_ts_coding( x0, y0, log2TbWidth, log2TbHeight, cIdx ) { | |
|   log2SbSize = ( Min( log2TbWidth, log2TbHeight ) < 2 ? 1 : 2) | |
|   numSbCoeff = 1 << ( log2SbSize << 1) | |
|   lastSubBlock = ( 1 << ( log2TbWidth + log2TbHeight − 2 * log2SbSize ) ) − 1 | |
|   inferSbCbf = 1 | |
|   MaxCcbs = 2 * ( 1 << log2TbWidth ) * ( 1<< log2TbHeight ) | |
|   for( i = 0; i <= lastSubBlock, i++ ) { | |
|     xS = DiagScanOrder[ log2TbWidth − log2SbSize ][ log2TbHeight − log2SbSize ] [ i ][ 0 ] | |
|     yS = | |

|  | Descriptor |
|---|---|
| DiagScanOrder[ log2TbWidth − log2SbSize ][ log2TbHeight − log2SbSize ] | |
| [ i ][ 1 ] | |
|     if( ( i != lastSubBlock \|\| !inferSbChf ) { | |
|       coded_sub_block_flag[ xS ][ yS ] | ae(v) |
|     } | |
|     if( coded_sub_block_flag[ xS ][ yS ] && i < lastSubBlock ) | |
|       inferSbCbf = 0 | |
| /* First scan pass */ | |
|     inferSbSigCoeffFlag = 1 | |
|     for( n = 0; n <= numSbCoeff − 1; n++) { | |
|       xC = ( xS << log2SbSize ) + | |
| DiagScanOrder + log2SbSize ][ log2SbSize ][ n ][ 0 ] | |
|       yC = ( yS << log2SbSize ) + | |
| DiagScanOrder + log2SbSize ][ log2SbSize ][ n ][ 1 ] | |
|       if( coded_sub_block_flag[ xS ][ yS ] && | |
|         ( n != numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ]) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         MaxCcbs− − | |
|         CoeffSignLevel[ xC ][ yC ] = ( coeff_sign_flag[ n ] > 0 ? − 1 : 1 ) | |
|         abslevel_gtx flag[ n ][ 0 ] | ae(v) |
|         MaxCcbs− − | |
|         if( abs_level_gtx_flag[ n ][ 0 ] ) { | |
|           par level_flag[ n ] | ae(v) |
|           MaxCcbs− − | |
|         } | |
|       } | |
|       AbsLevelPassX[ xC ][ yC ] = | |
|         sig_coeff_flag[ xC ][ yC ] + par_level_flag[ n ] + | |
| abs_level_gtx_flag[ n ][ 0 ] | |
|     } | |
| /* Greater than X scan pass (numGtXFlags=5) */ | |
|     for( n = 0; n <= numSbCoeff − 1; n++ ) { | |
|       xC = ( xS << log2SbSize ) + | |
| DiagScanOrder[ log2SbSize ][ log2SbSize ][ n ][ 0 ] | |
|       yC = ( yS << log2SbSize ) + | |
| DiagScanOrder[ log2SbSize ][ log2SbSize ][ n ][ 1 ] | |
|       for( j = 1; j < 5; j++) { | |
|         if( abs_level_gtx_flag[ n ][ j − 1 ] ) | |
|           abs_level_gtx_flag[ n ][ j ] | ae(v) |
|         MaxCcbs− − | |
|         AbsLevelPassX[ xC ][ yC ] + = 2 * abs_level_gtx_flag[ n ][ j ] | |
|       } | |
|     } | |
| /* remainder scan pass */ | |
|     for( n = 0; n <= numSbCoeff − 1; n++ ) { | |
|       xC = ( xS << log2SbSize ) + | |
| DiagScanOrder[ log2SbSize ][ log2SbSize ][ n ][ 0 ] | |
|       yC = ( yS << log2SbSize ) + | |
| DiagScanOrder[ log2SbSize ][ log2SbSize ][ n ][ 1 ] | |
|       if( abs_level_gtx_flag[ n ][ 4 ] ) | |
|         abs_remainder[ n ] | ae(v) |
|       if( intra_bdpcm_flag == 0 && sig_coeff_flag[ xC ][ yC ]) { | |
|         absRightCoeff = | |
| abs(TransCoeffLevel[ x0 ][ y0 ][ cIdx ][ xC − 1 ][ yC ] ) | |
|         absBelowCoeff = | |
| abs(TransCoeffLevel[ x0 ][ y0 ][ cIdx ][ xC ][ yC − 1 ] ) | |
|         predCoeff = Max( absRightCoeff, absBelowCoeff ) | |
|         if( AbsLevelPassX[ xC ][ yC ] + abs_remainder[ n ] = = 1 && | |
| predCoeff > 0 ) | |
|           TransCoeffLevel[ x0 ][ y0 ][ cIdx ][ xC][ yC ] = | |
|             ( 1 − 2 * coeff_sign_flag[ n ] ) * predCoeff | |
|         else if( AbsLevelPassX[ xC ][ yC ] + abs_remainder[ n ] <= | |
| predCoeff ) | |
|           TransCoeffLevel[ x0 ][ y0 ][ cIdx ][ xC ][ yC ] = ( 1 − 2 * | |
| coeff_sign_flag[ n ] ) * | |
|             ( AbsLevelPassX[ xC ][ yC ] + abs_remainder[ n ] − 1) | |
|         else | |
|           TransCoeffLevel[ x0 ][ y0 ][ cIdx ][ xC ][ yC ] = ( 1 − 2 * | |
| coeff_sign_flag[ n ] )* | |
|             ( AbsLevelPassX+ xC ][ yC + +abs_remainder+ n + ) | |

```
                                                                               Descriptor } else
        TransCoeffLevel[ x0 ][ y0 ][ cIdx ][ xC ][ yC ] = ( 1 - 2 *
coeff_sign_flag[ n ] )*
            ( AbsLevelPassX[ xC ][ yC ] + abs_remainder[ n ] )
    }
  }
}
```

Figure 17:
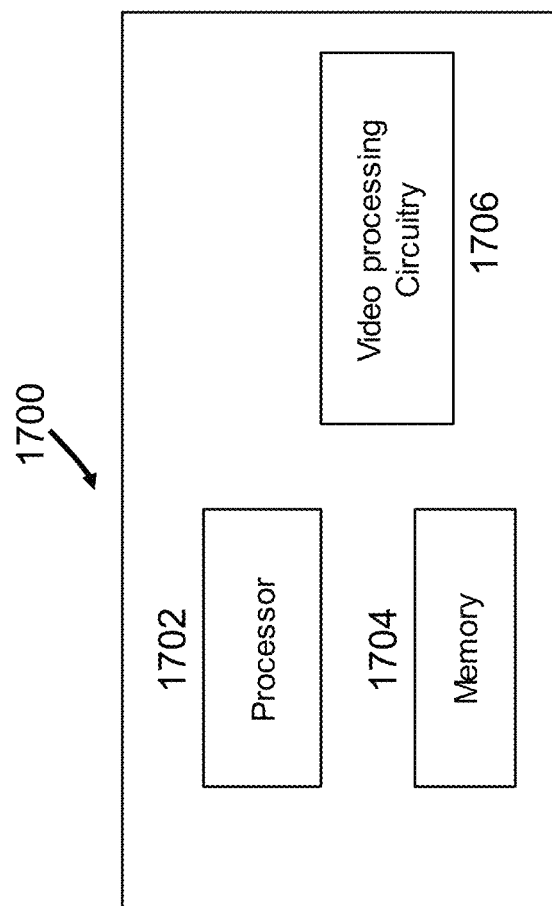
FIG. 17 is a block diagram of an example implementation of a hardware platform for video processing.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. In some embodiments, the video processing hardware 1706 may be at least partly internal to the processor 1702, e.g., a graphics co-processor.

The following solutions may be implemented as preferred solutions in some embodiments.

The following solutions may be implemented together with additional techniques described in items listed in the previous section (e.g., item 1).

Figure 18:
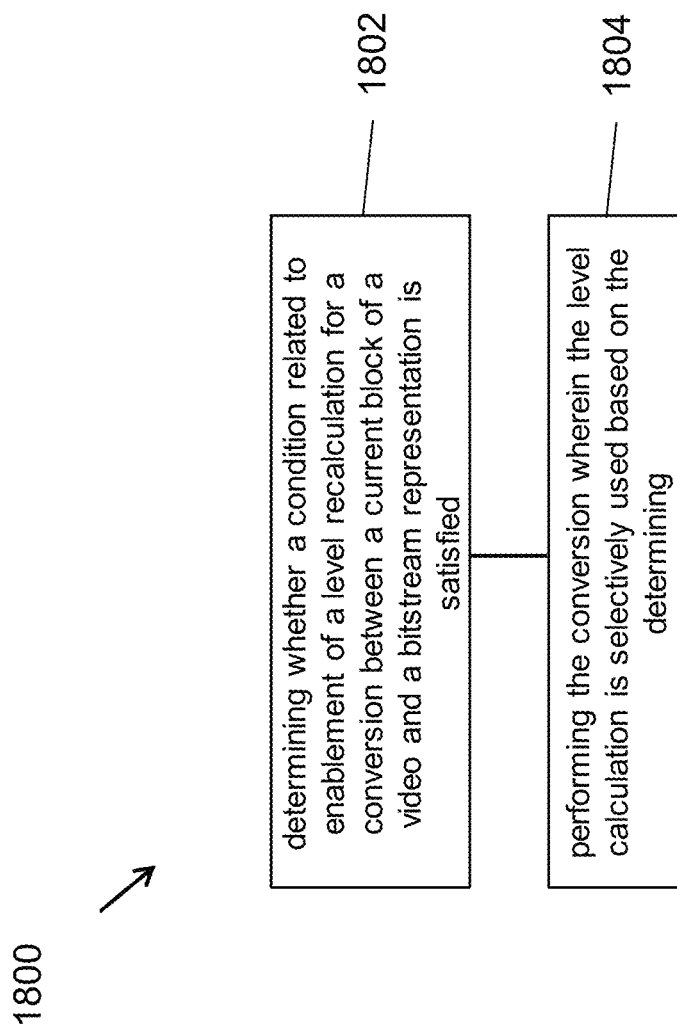
FIG. 18 is a flowchart for an example method of video processing.

1. A method of video processing (e.g., method 1800 depicted in FIG. 18), comprising: determining (1802) whether a condition related to enablement of a level recalculation for a conversion between a current block of a video and a bitstream representation is satisfied, performing (1804) the conversion wherein the level recalculation is selectively used based on the determining, wherein, the level recalculation includes changing between a first representation of a residual coefficient and a second representation of the residual coefficient of the current block used during the conversion.

2. The method of solution 1, wherein the condition is dependent on a decoded value of the residual coefficient during the conversion.

3. The method of solution 2, wherein the condition is that the decoded value of the residual coefficient is unequal to zero.

4. The method of solution 2, wherein the condition is that the decoded value of the residual coefficient is equal to zero.

5. The method of solution 4, further comprising disabling the level recalculation due to the condition not being satisfied.

The following solutions may be implemented together with additional techniques described in items listed in the previous section (e.g., item 2).

6. The method of solution 1, wherein the condition depends on a coding mode of the current block used during the conversion.

The following solutions may be implemented together with additional techniques described in items listed in the previous section (e.g., item 3).

7. The method of solution 1, wherein the condition is based on a side information about the current block that is used in the conversion.

8. The method of solution 7, wherein the side information includes a syntax element signaling that the level recalculation is enabled for the conversion of the current block.

9. The method of solution 8, wherein the syntax element is included at a video region level, wherein the video region includes the current block.

10. The method of solution 9, wherein the video region comprises a single coding tree unit or multiple coding units or a row or a tile or a brick or a slice or a picture or a sub-picture or a sequence or a view of the video.

The following solutions may be implemented together with additional techniques described in items listed in the previous section (e.g., item 4).

11. The method of any of solutions 1-10, wherein the condition further depends on a color format or a color component of the video to which the current block belongs.

12. The method of solution 11, wherein the condition is that the level recalculation is enabled for luma blocks and disabled for chroma blocks.

13. The method of any of solutions 11-12, wherein the condition is that the level recalculation is enabled only for 4:4:4 format.

The following solutions may be implemented together with additional techniques described in items listed in the previous section (e.g., item 5).

14. The method of any of solutions 1-13, wherein the condition is based on dimensions of the current block.

15. The method of solution 14, wherein dimensions of the current block include a height H and a width W and wherein the condition is that the level recalculation is disabled due to the current block satisfying W*H>=T1, where T1 is an integer.

16. The method of solution 14, wherein dimensions of the current block include a height H and a width W and wherein the condition is that the level recalculation is enabled due to the current block satisfying W*H>=T1, where T1 is an integer.

17. The method of solution 14, wherein dimensions of the current block include a height H and a width W and wherein the condition is that the level recalculation is disabled due to min(W,H)>=T1, where T1 is an integer.

18. The method of solution 14, wherein dimensions of the current block include a height H and a width W and wherein the condition is that the level recalculation is enabled due to min(W,H)>=T1, where T1 is an integer.

The following solutions may be implemented together with additional techniques described in items listed in the previous section (e.g., item 6).

19. A method of video processing, comprising: determining to perform a level recalculation for a conversion between a current block of a video and a bitstream representation is satisfied, wherein, the level recalculation includes changing between a first representation of a residual coefficient and a second representation of the residual coefficient of the current block used during the conversion; determining, based on a rule, one or more decoded coefficients used as predictors during the level recalculation; and performing the conversion using the one or more decoded coefficients.

20. The method of solution 19, wherein the rule specifies a number and/or identities of the one or more decoded coefficients.

21. The method of solution 20, wherein the rule specifies to use most recent K decoded coefficients, where K is an integer.

22. The method of solution 21, wherein K is signaled in the coded representation via a syntax element.

23. The method of solution 21, wherein K is not signaled in the coded representation.

24. The method of solution 21, wherein K is determinable based on a state of the conversion of the current block.

The following solutions may be implemented together with additional techniques described in items listed in the previous section (e.g., item 7).

25. A method of video processing, comprising: determining, for a conversion between a current block of a video and a coded representation, whether a subset of absolute coefficients of a video unit corresponding to the current block are all greater than M, where M is an integer, and performing the conversion based on the determining.

26. The method of solution 25, wherein the video unit is a coefficient group of the current block.

27. The method of solution 25, wherein the video unit is a transform block or a prediction block or a coding block of the current block.

28. The method of any of solutions 25-27, wherein the subset is based on a scanning order of coefficients used in the conversion.

29. The method of any of solutions 25-28, wherein the subset is based on coordinates of pixels making the video unit.

30. The method of any of solutions 25-29, wherein the subset is based on a coded mode of the current block.

31. The method of any of solutions 25-30, wherein the subset is based on dimensions of the current block.

32. The method of any of solutions 25-31, wherein M is zero.

33. The method of any of solutions 25-31, wherein M is one.

The following solutions may be implemented together with additional techniques described in items listed in the previous section (e.g., item 8).

34. A method of video processing, comprising: determining whether a rule related to enablement of a level recalculation for a conversion between a current block of a video and a bitstream representation is satisfied, wherein the conversion uses a block differential pulse-code modulation (BDPCM) coding tool; performing the conversion wherein the level recalculation is selectively used based on the determining, wherein, the level recalculation includes changing between a first representation of a residual coefficient and a second representation of the residual coefficient of the current block used during the conversion.

35. The method of solution 34, wherein the rule specifies that the level recalculation is performed only for specific positions of the residual block.

36. The method of solution 34, wherein the rule specifies to apply the level recalculation only for a non-predictively coded residual coefficient of the current block.

The following solutions may be implemented together with additional techniques described in items listed in the previous section (e.g., item 9).

37. A method of video processing, comprising: determining whether a rule related to enablement of a level recalculation for a conversion between a current block of a video and a bitstream representation is satisfied, wherein the conversion is based on a palette coding mode; performing the conversion wherein the level recalculation is selectively used based on the determining, wherein, the level recalculation includes changing between a first representation of a palette index or an escape symbol and a second representation of the palette index or the escape symbol during the conversion.

38. The method of solution 37, wherein the rule further specifies the level recalculation based on a level recalculation performed for a previous block.

The following solutions may be implemented together with additional techniques described in items listed in the previous section (e.g., item 10).

39. The method of any of solutions 1-38, wherein the conversion further uses context modeling function f (a0, a1, . . . ,), wherein parameters ai represent previously coded coefficients of palette indexes.

40. The method of solution 39, wherein an order of parameters ai is a function of a scanning order used for the current block.

The following solutions may be implemented together with additional techniques described in items listed in the previous section (e.g., items 11, 12).

41. A method of video processing, comprising: determining that a conversion between a current block and a bitstream representation of the current block is based on a transform skip mode in which a transform operation on coefficients of the current block is skipped, determining a context model for the conversion based on the coefficients and a rule, and performing the conversion using the transform skip mode and based on the context model.

42. The method of solution 41, wherein rule specifies to use a decoding or scanning order of the coefficients for the determining the context model.

43. The method of solution 42, wherein the rule specifies to use most recent K coefficients.

44. The method of solution 41, wherein the rule specifies to use a prediction direction of the coefficients for the determining the context model.

The following solutions may be implemented together with additional techniques described in items listed in the previous section (e.g., item 13).

45. The method of any of solutions 1-44, wherein the use of the method is signaled in the coded representation using a syntax element.

46. The method of solution 45, wherein the syntax element is included at a sequence parameter set/view parameter set, an adaptation parameter set, a picture parameter set, a picture header, or a slice header.

The following solutions may be implemented together with additional techniques described in items listed in the previous section (e.g., item 14).

47. The method of any of solutions 1-46, wherein the method is selectively used based on a coding condition.

48. The method of solution 47, wherein the coding condition is coding information or a block dimension or a slice type or a picture type or a temporal layer index or a video content or a color component or a partitioning tree type or a coded mode or a transform information.

49. The method of any of solutions 1 to 48, wherein the conversion comprises encoding the video into the coded representation.

50. The method of any of solutions 1 to 48, wherein the conversion comprises decoding the coded representation to generate pixel values of the video.

51. A video decoding apparatus comprising a processor configured to implement a method recited in one or more of solutions 1 to 50.

52. A video encoding apparatus comprising a processor configured to implement a method recited in one or more of solutions 1 to 50.

53. A computer program product having computer code stored thereon, the code, when executed by a processor, causes the processor to implement a method recited in any of solutions 1 to 50.

54. A method, apparatus or system described in the present document.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 21:
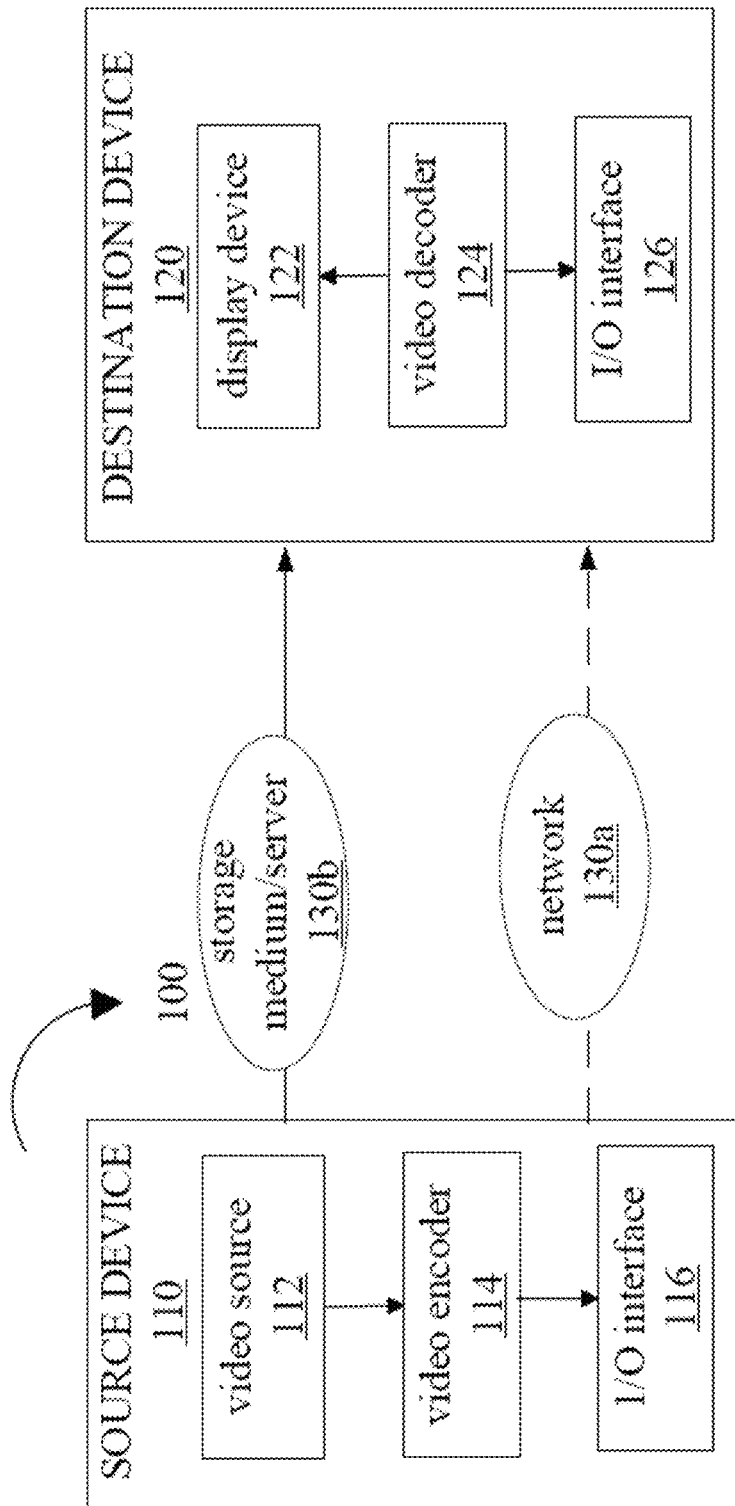
FIG. 21 is a block diagram that illustrates an example video coding system that may utilize the techniques of this disclosure.

FIG. 21 is a block diagram that illustrates an example video coding system 100 that may utilize the techniques of this disclosure. As shown in FIG. 21, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 22:
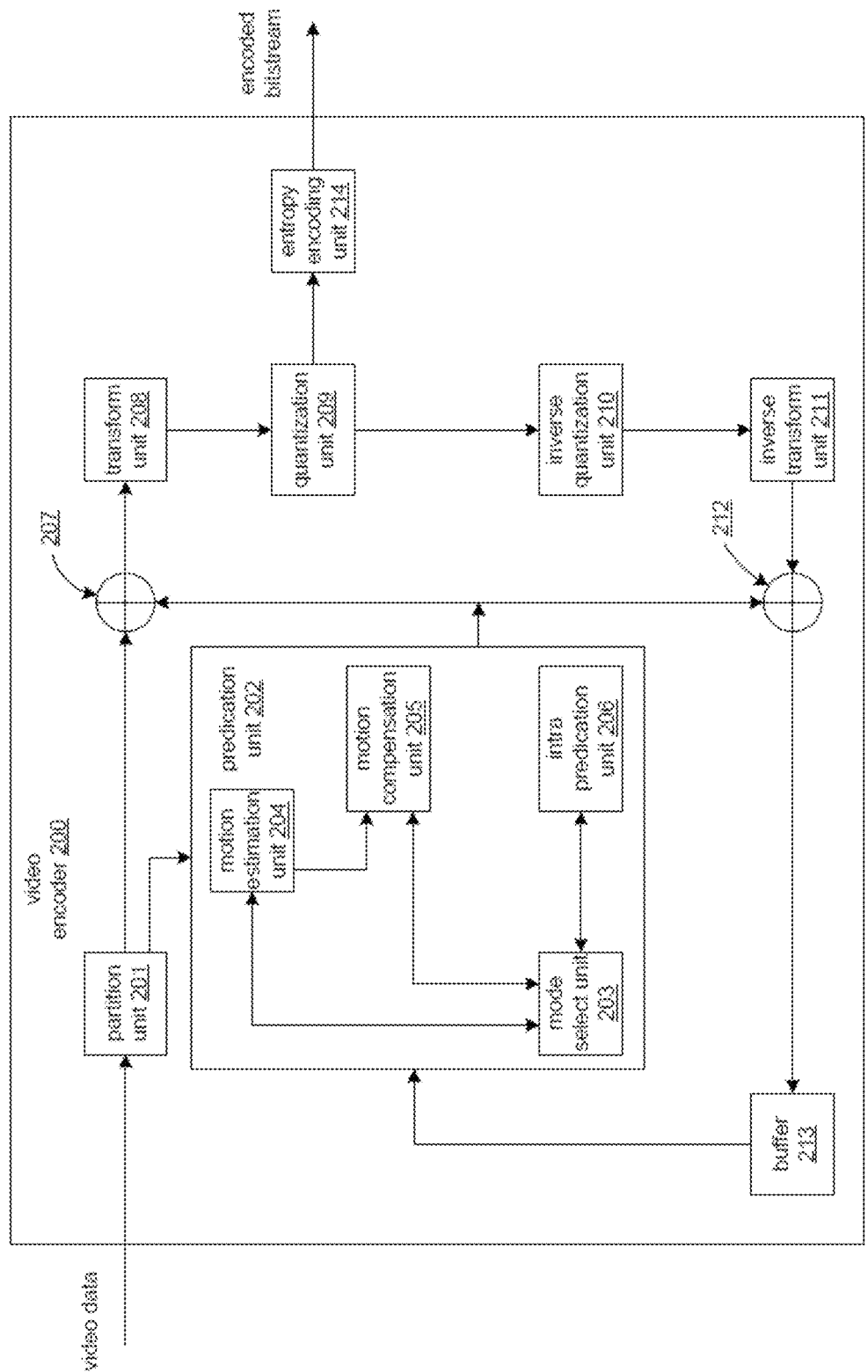
FIG. 22 is a block diagram illustrating an example of video encoder.

FIG. 22 is a block diagram illustrating an example of video encoder 200, which may be video encoder 114 in the system 100 illustrated in FIG. 21.

Video encoder 200 may be configured to perform any or all of the techniques of this disclosure. In the example of FIG. 22, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 22 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution fora motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations fora current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 fora reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 19:
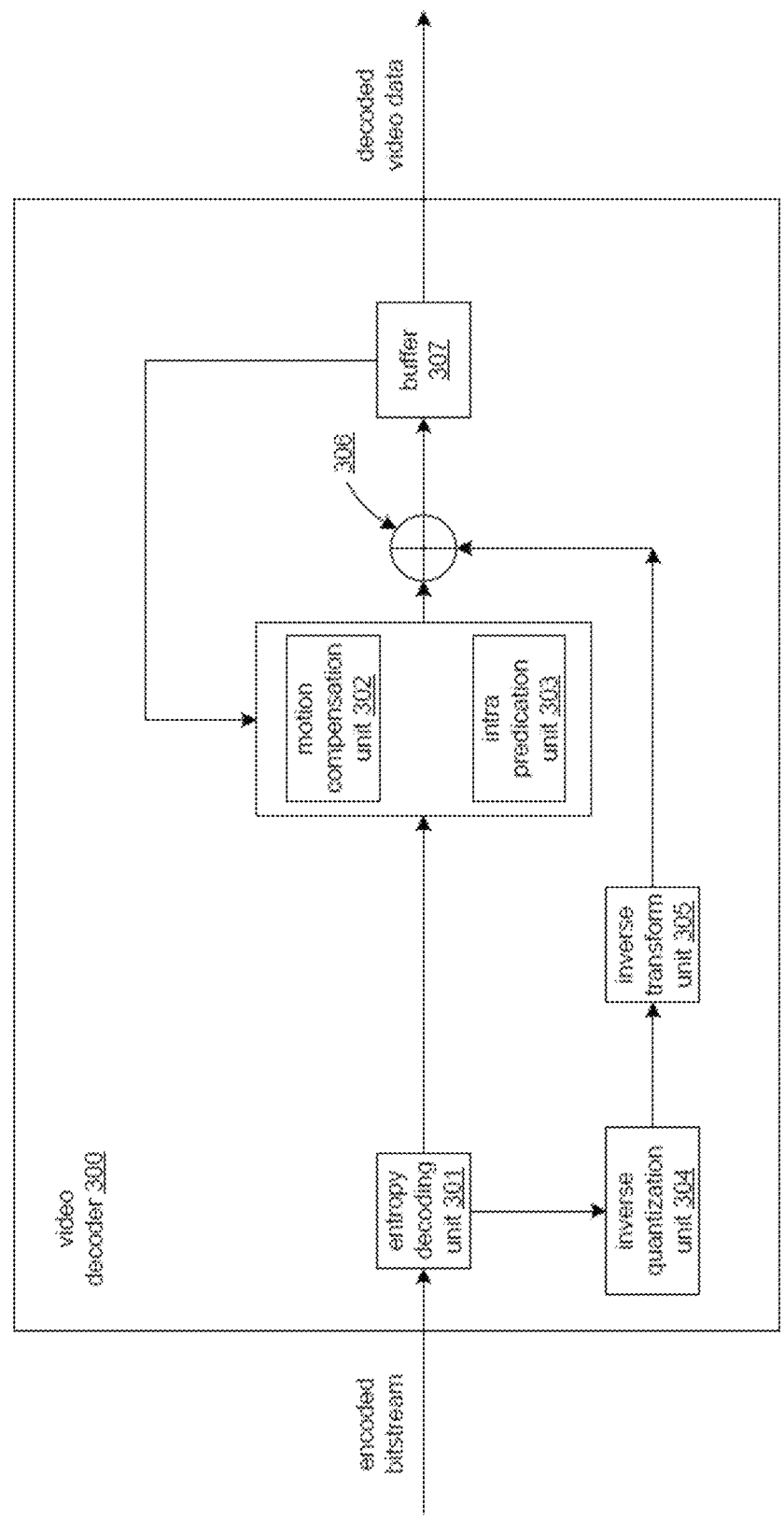
FIG. 19 is a block diagram illustrating an example of video decoder.

FIG. 19 is a block diagram illustrating an example of video decoder 300 which may be video decoder 114 in the system 100 illustrated in FIG. 21.

The video decoder 300 may be configured to perform any or all of the techniques of this disclosure. In the example of FIG. 19, the video decoder 300 includes a plurality of functional components. The techniques described in this disclosure may be shared among the various components of the video decoder 300. In some examples, a processor may be configured to perform any or all of the techniques described in this disclosure.

In the example of FIG. 19, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 22).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

In the present document, the term "video processing" may refer to video encoding, video decoding, video compression or video decompression. For example, video compression algorithms may be applied during conversion from pixel representation of a video to a corresponding bitstream representation or vice versa. The bitstream representation, or coded representation, of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Figure 20:
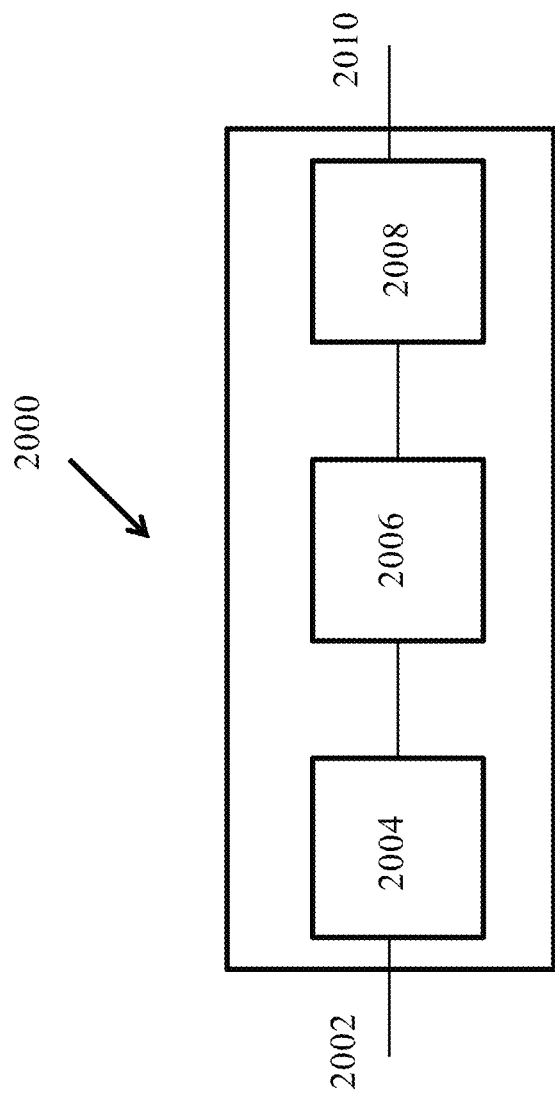
FIG. 20 is a block diagram showing an example video processing system in which various techniques disclosed herein may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 23:
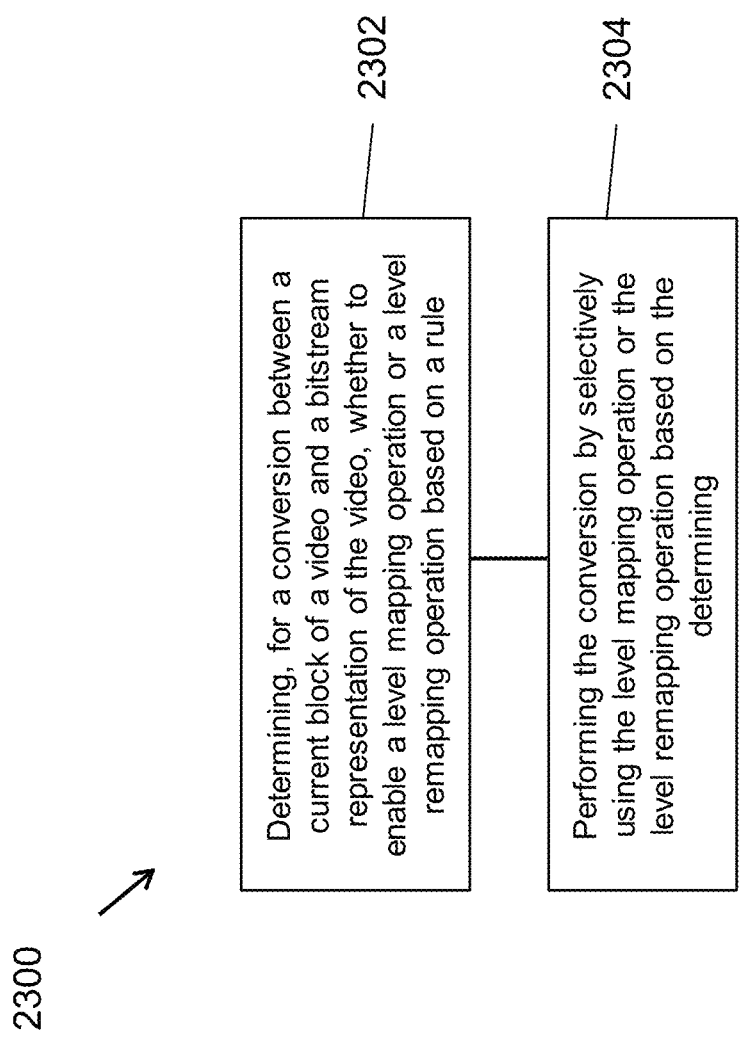

FIG. 23 shows a video processing method 2300 that includes determining (2302), for a conversion between a current block of a video and a bitstream representation of the video, whether to enable a level mapping operation or a level remapping operation based on a rule, wherein the level mapping operation or the level remapping operation includes changing between a first representation of a residual coefficient of the current block and a second representation of the residual coefficient of the current block based on neighboring residual coefficients of the residual coefficient; and performing (2304) the conversion by selectively using the level mapping operation or the level remapping operation based on the determining.

Figure 24:
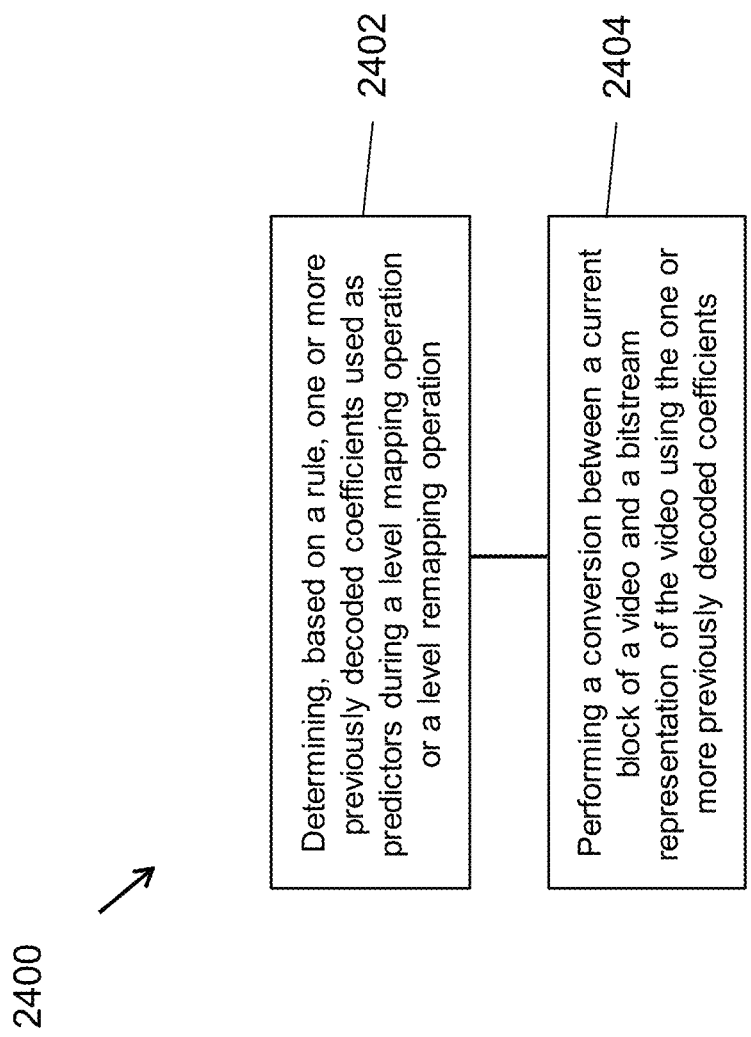

FIG. 24 shows a video processing method 2400 that includes determining (2402), based on a rule, one or more previously decoded coefficients used as predictors during a level mapping operation or a level remapping operation, wherein the level mapping operation or the level remapping operation includes changing between a first representation of a residual coefficient and a second representation of the residual coefficient of the current block based on neighboring residual coefficients of the residual coefficient, wherein the one or more previously decoded coefficients are used according to a decoding order or a scanning order; and performing (2404) a conversion between a current block of a video and a bitstream representation of the video using the one or more previously decoded coefficients.

FIG. 25 shows a video processing method 2500 that includes performing (2502) a conversion between a current block of a video and a bitstream representation of the video, wherein the bitstream representation conforms to a format rule that specifies that a syntax element is included in the bitstream for indicating that absolute values of a subset of coefficients of a video unit of the current block are greater than M, wherein M is an integer.

The following section describes example video processing techniques that are numbered:

1. A method of video processing, comprising: determining, fora conversion between a current block of a video and a bitstream representation of the video, whether to enable a level mapping operation or a level remapping operation based on a rule, wherein the level mapping operation or the level remapping operation includes changing between a first representation of a residual coefficient of the current block and a second representation of the residual coefficient of the current block based on neighboring residual coefficients of the residual coefficient; and performing the conversion by selectively using the level mapping operation or the level remapping operation based on the determining.

2. The method of example 1, wherein the rule specifies that whether the level mapping operation or the level remapping operation is enabled is based on whether a decoded value of the residual coefficient or a signaled value of the residual coefficient is unequal to zero.

3. The method of example 1, wherein the rule specifies that the level mapping operation or the level remapping operation is disabled in response to a decoded value of the residual coefficient or a signaled value of the residual coefficient being equal to zero.

4. The method of any of examples 2 or 3, wherein the decoded value of the residual coefficient or a signaled value of the residual coefficient includes a value of a significant coefficient flag in the bitstream representation that indicates whether the residual coefficient has an absolute level greater than zero.

5. The method of any of examples 2 or 3, wherein the decoded value of the residual coefficient or a signaled value of the residual coefficient includes an absolute value of a coefficient level.

6A. The method of any of examples 2 or 3, wherein the decoded value of the residual coefficient or a signaled value of the residual coefficient includes a combination of a first absolute value of a coefficient level and a second absolute value of a remainder of a magnitude of the residual coefficient.

6B. The method of any of examples 2 or 3, wherein the decoded value of the residual coefficient or a signaled value of the residual coefficient includes a remainder of a magnitude of the residual coefficient.

7. The method of example 1, wherein a significant coefficient flag indicated in the bitstream representation is equal to zero when a quantized value of the residual coefficient or a value of the residual coefficient to be coded before applying the level mapping operation is equal to zero, and wherein the significant coefficient flag indicates whether the residual coefficient has an absolute level greater than zero, 8. The method of example 1, wherein the rule specifies that whether the level mapping operation or the level remapping operation is enabled depends on a decoded residual information of either the current block or a neighboring block of the current block.

9. The method of example 8, wherein the neighboring block is an adjacent neighboring block located adjacent to the current block, or 0 wherein the neighboring block is a non-adjacent neighboring block that is not adjacent to the current block.

10. The method of example 8, wherein the rule specifies that whether the level mapping operation or the level remapping operation is enabled is determinable based on a coding mode of the current block used during the conversion.

11. The method of example 10, wherein the coding mode includes a non-block differential pulse code modulation (non-BDPCM) transport skip (TS) mode in which a transform operation on the residual coefficient of the current block is skipped.

12. The method of example 1, wherein the rule specifies that whether the level mapping operation or the level remapping operation is enabled is based on a side information of the current block, and wherein the side information is signaled in a video region level that includes the current block.

13. The method of example 12, wherein the side information is associated with a syntax element that signals whether that the level mapping operation or the level remapping operation is enabled for the conversion of the current block.

14. The method of example 12, wherein the video region level comprises a sub-region of a coding tree unit (CTU).

15. The method of example 14, wherein the sub-region of a coding tree unit (CTU) includes a virtual pipeline data unit (VPDU), a single coding tree unit (CTU), a coding tree block (CTB), multiple coding tree units (CTUs), multiple coding units (CUs), a coding tree unit (CTU) row, a tile, a brick, a slice, a picture, a sub-picture, a sequence, or a view of the video.

16. The method of example 12, wherein whether the level mapping operation or the level remapping operation is enabled is indicated in the bitstream representation in a sequence parameter set, a view parameter set, an adaptation parameter set, a picture parameter set, a picture header a slice header, a coding unit (CU), a picture unit (PU), a transform unit (TU), a coding tree unit (CTU), or a coding tree block (CTB) of the video.

17. The method of example 1, wherein rule specifies that whether the level mapping operation or the level remapping operation is enabled is based on a color format or a color component of the video to which the current block belongs.

18. The method of example 17, wherein the rule specifies that the level mapping operation or the level remapping operation is enabled for luma blocks and disabled for chroma blocks.

19. The method of example 17, wherein the rule specifies that the level mapping operation or the level remapping operation is enabled for the luma blocks and disabled for the chroma blocks when a color format of the video is a 4:2:0 format.

20. The method of example 17, wherein the rule specifies that the level mapping operation or the level remapping operation is enabled for all color components when a color format of the video is a 4:4:4 format or when a separate color plane coding mode is used during the conversion.

21. The method of example 1, wherein the rule specifies that whether the level mapping operation or the level remapping operation is enabled is based on dimensions of the current block.

22. The method of example 21, wherein dimensions of the current block include a height H and a width W, and wherein the rule specifies that the level mapping operation or the level remapping operation is disabled due to the current block satisfying W*H>=T1, where T1 is an integer.

23. The method of example 21, wherein dimensions of the current block include a height H and a width W, and wherein the rule specifies that the level mapping operation or the level remapping operation is disabled due to the current block satisfying W*H<=T1, where T1 is an integer.

24. The method of example 21, wherein dimensions of the current block include a height H and a width W, and wherein the rule specifies that the level mapping operation or the level remapping operation is disabled due to min (W,H)>=T1, where T1 is an integer.

25. The method of example 21, wherein dimensions of the current block include a height H and a width W, and wherein the rule specifies that the level mapping operation or the level remapping operation is disabled due to max(W,H) <=T1, where T1 is an integer.

26. The method of example 21, wherein dimensions of the current block include a height H and a width W, and wherein the rule specifies that the level mapping operation or the level remapping operation is disabled due to min(W,H) <=T1, where T1 is an integer.

27. The method of example 21, wherein dimensions of the current block include a height H and a width W, and wherein the rule specifies that the level mapping operation or the level remapping operation is disabled due to max (W,H)>=T1, where T1 is an integer.

28. The method of example 21, wherein dimensions of the current block include a height H and a width W, and wherein the rule specifies that the level mapping operation or the level remapping operation is disabled due to W>=T1 and H>=T2, where T1 and T2 are integers.

29. The method of example 21, wherein dimensions of the current block include a height H and a width W, and wherein the rule specifies that the level mapping operation or the level remapping operation is disabled due to W<=T1 and H<=T2, where T1 and T2 are integers.

30. A method of video processing, comprising: determining, based on a rule, one or more previously decoded coefficients used as predictors during a level mapping operation or a level remapping operation, wherein the level mapping operation or the level remapping operation includes changing between a first representation of a residual coefficient and a second representation of the residual coefficient of the current block based on neighboring residual coefficients of the residual coefficient, wherein the one or more previously decoded coefficients are used according to a decoding order or a scanning order; and performing a conversion between a current block of a video and a bitstream representation of the video using the one or more previously decoded coefficients.

31. The method of example 30, wherein the rule specifies to use most recent K previously decoded coefficients, where K is an integer.

32. The method of example 30, wherein the rule specifics that K previously decoded coefficients out of most recent M previously decoded coefficients are used, wherein K and M are integers, and wherein M is greater than K.

33. The method of example 30, wherein a number of the one or more previously decoded coefficients are signaled in the bitstream representation via a syntax element.

34. The method of example 30, wherein a number of the one or more previously decoded coefficients are pre-defined.

35. The method of example 30, wherein a number of the one or more previously decoded coefficients are determinable based on a decoded information of the current block.

36. The method of example 30, wherein a number of the one or more previously decoded coefficients depends on a number of residual coefficients that have been decoded.

37. The method of example 36, wherein the number is a minimum of S or M, wherein S is the number of residual coefficients that have been decoded, and wherein M is a fixed number.

38. A method of video processing, comprising: performing a conversion between a current block of a video and a bitstream representation of the video, wherein the bitstream representation conforms to a format rule that specifies that a syntax element is included in the bitstream for indicating that absolute values of a subset of coefficients of a video unit of the current block are greater than M, wherein M is an integer.

39. The method of example 38, wherein the video unit is a coefficient group or a transform block or a prediction block or a coding block of the current block.

40. The method of example 38, wherein the subset is based on a scanning order used in the conversion.

41. The method of example 40, wherein the subset includes a first L coefficients according to a forward scanning order, wherein L is an integer.

42. The method of example 40, wherein the subset includes a last L coefficients according to a forward scanning order, wherein L is an integer.

43. The method of example 40, wherein the subset includes a first L coefficients according to a decoding order in the video unit, wherein L is an integer.

44. The method of example 38, wherein the subset is based on coordinates of pixels comprising the video unit.

45. The method of example 44, wherein the subset includes the coefficients in a rectangular region of the video unit.

46. The method of example 44, wherein the subset includes the coefficients in a square region of the video unit.

47. The method of example 38, wherein the subset is based on a coded mode of the current block.

48. The method of example 47, wherein the subset is defined to include a top-most row of the coefficients in response to the current block being coded with a block differential pulse code modulation (BDPCM) coding tool or quantized residual domain BDPCM (QR-BDPCM) coding tool and in response to the current block being predicted in a vertical direction.

49. The method of example 47, wherein the subset is defined to include a left-most row of the coefficients in response to the current block being coded with a block differential pulse code modulation (BDPCM) coding tool or quantized residual domain BDPCM (QR-BDPCM) coding tool and in response to the current block being predicted in a horizontal direction.

50. The method of example 38, wherein the subset is based on dimensions of the current block.

51. The method of example 38, wherein M is equal to 0, 1, 2, 3, 4, or 5.

52. The method of example 1, wherein the current block is a non-transform skip coded block.

53. The method of example 52, wherein the conversion uses a block differential pulse code modulation (BDPCM) coding tool on the current block.

54. The method of example 52, wherein the rule specifies that the level mapping operation or the level remapping operation is performed only for specific positions of residual coefficients.

55. The method of example 54, wherein the specific positions depend on a prediction direction.

56. The method of example 55, wherein the residual coefficients are located at a first row in response the prediction direction being vertical.

57. The method of example 55, wherein the residual coefficients are located at a first column in response the prediction direction being horizontal.

58. The method of example 52, wherein the rule specifies that the level mapping operation or the level remapping operation is enabled only for residual coefficients that are non-predictively coded.

59. The method of example 58, wherein the residual coefficients are located at a first row fora vertical prediction direction.

60. The method of example 58, wherein the residual coefficients are located at a first column for a horizontal prediction direction.

61. The method of example 1, wherein the conversion is based on a palette coding mode.

62. The method of example 61, wherein the rule further specifies the palette index is based on a maximum value of a previously coded palette index from a previous block of the video.

63. The method of example 61, wherein the rule further specifies that the level mapping operation or the level remapping is enabled for all palette coded blocks of the video.

64. The method of example 61, wherein the rule further specifies that the level mapping operation or the level remapping is enabled under a specified condition.

65. The method of any of examples 1 to 64, wherein the conversion further uses a context modeling process in which the residual coefficient depends on residual information of a neighboring block of the current block, wherein the context modeling process uses using a context modeling function $f(a0, a1, \ldots,)$, wherein parameters ai represent previously coded coefficients or palette indexes, and wherein i is greater than or equal to zero.

66. The method of example 65, wherein the context modeling function $f(a0, a1, \ldots,)$ is a maximum function or a minimum function.

67. The method of example 65, wherein the parameters ai include a template covering current sample or coefficient and at least some neighboring blocks of the current block.

68. The method of example 67, wherein fora palette index coding, the palette index is coded using a left palette index and an above palette index based on the context modeling function $f(a0, a1, \ldots,)$.

69. The method of example 67, wherein fora palette index coding, the palette index is coded using a left palette index and an above palette index based on the context modeling function $f(a0, a1, \ldots,)$.

70. The method of example 65, wherein an order of parameters ai is a function of a scanning order used for the current block.

71. The method of example 1, wherein one or more decoded coefficients are used to obtain a syntax element for a context modeling process during the conversion, and wherein the one or more decoded coefficients are used according to a decoding order or a scanning order.

72. The method of example 71, wherein the syntax element includes a coding sign flag.

73. The method of example 71, wherein most recent K decoded coefficients are used, where K is an integer.

74. The method of example 71, wherein K decoded coefficients out of most recent M decoded coefficients are used, wherein K and M are integers, and wherein M is greater than K.

75. The method of example 71, wherein a number of the one or more decoded coefficients are signaled in the bitstream representation via a syntax element.

76. The method of example 71, wherein a number of the one or more decoded coefficients are pre-defined.

77. The method of example 71, wherein a number of the one or more decoded coefficients are determinable based on decoded information of the current block.

78. The method of example 71, wherein a number of the one or more decoded coefficients depends on a number of residual coefficients that have been decoded.

79. The method of example 78, wherein the number is a minimum of S or M, wherein S is the number of residual coefficients that have been decoded, and wherein M is a fixed number.

80. The method of example 1, wherein one or more decoded coefficients are used to obtain a syntax element for a context modeling process during the conversion, and wherein the one or more decoded coefficients are used according to a prediction direction.

81. The method of example 80, wherein the syntax element includes a coding sign flag.

82. The method of example 80, wherein the one or more decoded coefficients are one or more previously decoded coefficients in a same column as that of the current block in response to the current block being a block differential pulse code modulation (BDPCM) coded block with a vertical prediction direction.

83. The method of example 80, wherein the one or more decoded coefficients are one or more previously decoded coefficients in a same row as that of the current block in response to the current block being a block differential pulse code modulation (BDPCM) coded block with a horizontal prediction direction.

84. The method of example 80, wherein the one or more decoded coefficients are one or more previously decoded coefficients in a same row as that of the current block in response to the current block being a block differential pulse code modulation (BDPCM) coded block with a vertical prediction direction.

85. The method of example 80, wherein the one or more decoded coefficients are one or more previously decoded coefficients in a same column as that of the current block in response to the current block being a block differential pulse code modulation (BDPCM) coded block with a horizontal prediction direction.

86. The method of example 1, wherein one or more decoded coefficients are used to obtain a syntax element for a context modeling process during the conversion, and wherein a value of the syntax element is set dynamically according to an information of neighboring blocks of the current block or according to a selected context.

87. The method of example 86, wherein the value of the syntax element is based on whether a sign information of a current coefficient is same as majority of sign information of previously coded coefficients of the video.

88. The method of example 86, wherein, in response to the selected context representing majority of the neighboring blocks is negative, the value of the syntax element is equal to one to indicate a positive value and the value of the syntax element is equal to zero to indicate a negative value.

89. The method of example 88, wherein the majority of the neighboring blocks is negative in response to two neighboring blocks being negative or in response to one neighboring block being negative and another neighboring block being equal to zero.

90. The method of example 86, wherein, in response to the selected context representing majority of the neighboring blocks is positive, the value of the syntax element is equal to zero to indicate a positive value and the value of the syntax element is equal to one to indicate a negative value.

91. The method of example 90, wherein the majority of the neighboring blocks is positive in response to two neighboring blocks being positive or in response to one neighboring block being positive and another neighboring block being equal to zero.

92. The method of example 86, wherein, in response to the selected context representing majority of the neighboring blocks is negative, the value of the syntax element is equal to zero to indicate a positive value and the value of the syntax element is equal to one to indicate a negative value.

93. The method of example 92, wherein the majority of the neighboring blocks is negative in response to two neighboring blocks being negative or in response to one neighboring block being negative and another neighboring block being equal to zero.

94. The method of example 86, wherein, in response to the selected context representing majority of the neighboring blocks is positive, the value of the syntax element is equal to one to indicate a positive value and the value of the syntax element is equal to zero to indicate a negative value.

95. The method of example 94, wherein the majority of the neighboring blocks is positive in response to two neighboring blocks being positive or in response to one neighboring block being positive and another neighboring block being equal to zero.

96. The method of any of examples 1 to 95, wherein whether the level mapping operation or the level remapping operation is enabled to the current block is indicated in a video unit level.

97. The method of example 96, wherein the video unit includes a tile, a brick, a slice, a picture, a sub-picture, a sequence, a view.

98. The method of example 96, wherein whether the level mapping operation or the level remapping operation is enabled and a process by which the level remapping operation is enabled is signaled in a sequence parameter set, a view parameter set, an adaptation parameter set, a picture parameter set, a picture header, or a slice header.

99. The method of example 96, wherein whether the level mapping operation or the level remapping operation is and a process by which the level mapping operation or the level remapping operation is enabled is indicated by a syntax element.

100. The method of example 99, wherein the syntax element indicates whether a video content associated with the video is screen content.

101. The method of any of examples 1 to 95, wherein whether the level mapping operation or the level remapping operation is enabled is based on coding information of the current block.

102. The method of example 101, wherein the coding information includes block dimension, a slice type, a picture type, a temporal layer index, a video content, a color component, a partitioning tree type, a coded mode, or a transform information of the current block.

103. The method of example 101, wherein the level mapping operation or the level remapping operation is enabled in response to a width of the current block being no greater than T1 and a height of the current block being no greater than T2.

104. The method of example 101, wherein the level mapping operation or the level remapping operation is enabled in response to a width of the current block being no greater than T1 or a height of the current block being no greater than T2.

105. The method of example 101, wherein the level mapping operation or the level remapping operation is enabled in response to a width of the current block times a height of the current video block is no greater than T3.

106. The method of any of examples 1 to 107, wherein the conversion comprises encoding the current block into the bitstream representation.

107. The method of any of examples 1 to 107, wherein the conversion comprises decoding the bitstream representation to generate pixel values of the current block.

108. A video decoding apparatus comprising a processor configured to implement a method recited in one or more of examples 1 to 107.

109. A video encoding apparatus comprising a processor configured to implement a method recited in one or more of examples 1 to 107.

110. A computer program product having computer code stored thereon, the code, when executed by a processor, causes the processor to implement a method recited in any of examples 1 to 107.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, for a conversion between a current block of a video and a bitstream of the video, whether to enable a level mapping operation or a level remapping operation based on whether a significant coefficient flag is equal to zero, wherein the significant coefficient flag indicates whether a residual coefficient of the current block has an absolute level greater than zero, and wherein the level mapping operation or the level remapping operation includes changing between a first representation of the residual coefficient and a second representation of the residual coefficient based on neighboring residual coefficients of the residual coefficient; and
    performing the conversion by selectively using the level mapping operation or the level remapping operation based on the determining.

2. The method of claim 1, wherein the current block is coded with a transform skip (TS) mode, in which a transform operation on the residual coefficient of the current block is skipped.

3. The method of claim 1, wherein the level mapping operation or the level remapping operation is disabled in response to the significant coefficient flag being equal to zero.

4. The method of claim 1, wherein whether the level mapping operation or the level remapping operation is enabled is further based on whether an absolute value of a coefficient level is equal to zero.

5. The method of claim 4, wherein the level mapping operation or the level remapping operation is disabled in response to the absolute value of the coefficient level being equal to zero.

6. The method of claim 1, wherein whether the level mapping operation or the level remapping operation is enabled is further based on whether a combination of an absolute value of a coefficient level and a remaining absolute value of the coefficient level is equal to zero.

7. The method of claim 6, wherein the level mapping operation or the level remapping operation is disabled in response to the combination being equal to zero.

8. The method of claim 1, wherein the level mapping operation or the level remapping operation is enabled in response to the significant coefficient flag being unequal to zero.

9. The method of claim 4, wherein the level mapping operation or the level remapping operation is enabled in response to the absolute value of the coefficient level being unequal to zero.

10. The method of claim 6, wherein the level mapping operation or the level remapping operation is enabled in response to the combination being unequal to zero.

11. The method of claim 1, wherein the conversion includes encoding the current block into the bitstream.

12. The method of claim 1, wherein the conversion includes decoding the current block from the bitstream.

13. An apparatus for processing video data comprising a processor and a non-transitory memory with instructions thereon, wherein the instructions upon execution by the processor, cause the processor to:

determine, for a conversion between a current block of a video and a bitstream of the video, whether to enable a level mapping operation or a level remapping operation based on whether a significant coefficient flag is equal to zero, wherein the significant coefficient flag indicates whether a residual coefficient of the current block has an absolute level greater than zero, and wherein the level mapping operation or the level remapping operation includes changing between a first representation of the residual coefficient and a second representation of the residual coefficient based on neighboring residual coefficients of the residual coefficient; and perform the conversion by selectively using the level mapping operation or the level remapping operation based on the determination.

14. The apparatus of claim 13, wherein the current block is coded with a transform skip (TS) mode, in which a transform operation on the residual coefficient of the current block is skipped; and wherein the level mapping operation or the level remapping operation is disabled in response to the significant coefficient flag being equal to zero.

15. The apparatus of claim 13, wherein whether the level mapping operation or the level remapping operation is enabled is further based on whether an absolute value of a coefficient level is equal to zero;

wherein the level mapping operation or the level remapping operation is disabled in response to the absolute value of the coefficient level being equal to zero;

wherein whether the level mapping operation or the level remapping operation is enabled is further based on whether a combination of an absolute value of a coefficient level and a remaining absolute value of the coefficient level is equal to zero;

wherein the level mapping operation or the level remapping operation is disabled in response to the combination being equal to zero; and wherein the level mapping operation or the level remapping operation is enabled in response to at least one of the significant coefficient flag, the absolute value of the coefficient level or the combination being unequal to zero.

16. A non-transitory computer-readable storage medium storing instructions that cause a processor to:

determine, for a conversion between a current block of a video and a bitstream of the video, whether to enable a level mapping operation or a level remapping operation based on whether a significant coefficient flag is equal to zero, wherein the significant coefficient flag indicates whether a residual coefficient of the current block has an absolute level greater than zero, and wherein the level mapping operation or the level remapping operation includes changing between a first representation of the residual coefficient and a second representation of the residual coefficient based on neighboring residual coefficients of the residual coefficient; and perform the conversion by selectively using the level mapping operation or the level remapping operation based on the determination.

17. The non-transitory computer-readable storage medium of claim 16, wherein the current block is coded with a transform skip (TS) mode, in which a transform operation on the residual coefficient of the current block is skipped; and wherein the level mapping operation or the level remapping operation is disabled in response to the significant coefficient flag being equal to zero.

18. The non-transitory computer-readable storage medium of claim 16, wherein whether the level mapping operation or the level remapping operation is enabled is further based on whether an absolute value of a coefficient level is equal to zero;

wherein the level mapping operation or the level remapping operation is disabled in response to the absolute value of the coefficient level being equal to zero;

wherein whether the level mapping operation or the level remapping operation is enabled is further based on whether a combination of an absolute value of a coefficient level and a remaining absolute value of the coefficient level is equal to zero;

wherein the level mapping operation or the level remapping operation is disabled in response to the combination being equal to zero; and wherein the level mapping operation or the level remapping operation is enabled in response to at least one of the significant coefficient flag, the absolute value of the coefficient level or the combination being unequal to zero.

19. A non-transitory computer-readable recording medium storing a bitstream of a video which is generated by a method performed by a video processing apparatus, wherein the method comprises:

determining, for current block of a video, whether to enable a level mapping operation or a level remapping operation based on whether a significant coefficient flag is equal to zero, wherein the significant coefficient flag indicates whether a residual coefficient of the current block has an absolute level greater than zero, and wherein the level mapping operation or the level remapping operation includes changing between a first representation of the residual coefficient and a second representation of the residual coefficient based on neighboring residual coefficients of the residual coefficient; and generating the bitstream by selectively using the level mapping operation or the level remapping operation based on the determining.

20. The non-transitory computer-readable recording medium of claim 19, wherein the current block is coded with a transform skip (TS) mode, in which a transform operation on the residual coefficient of the current block is skipped;

wherein the level mapping operation or the level remapping operation is disabled in response to the significant coefficient flag being equal to zero;

wherein whether the level mapping operation or the level remapping operation is enabled is further based on whether an absolute value of a coefficient level is equal to zero;

wherein the level mapping operation or the level remapping operation is disabled in response to the absolute value of the coefficient level being equal to zero;

wherein whether the level mapping operation or the level remapping operation is enabled is further based on whether a combination of an absolute value of a coefficient level and a remaining absolute value of the coefficient level is equal to zero;

wherein the level mapping operation or the level remapping operation is disabled in response to the combination being equal to zero; and wherein the level mapping operation or the level remapping operation is enabled in response to at least one of the significant coefficient flag, the absolute value of the coefficient level or the combination being unequal to zero.

* * * * *